(12) United States Patent
Antol et al.

(10) Patent No.: US 10,902,262 B2
(45) Date of Patent: Jan. 26, 2021

(54) VISION INTELLIGENCE MANAGEMENT FOR ELECTRONIC DEVICES

(71) Applicant: Samsung Electronics Co., Ltd., Suwon-si (KR)

(72) Inventors: Stanislaw Antol, Cupertino, CA (US); Abhijit Bendale, Sunnyvale, CA (US); Simon J. Gibbs, San Jose, CA (US); Won J. Jeon, San Jose, CA (US); Hyun Jae Kang, Santa Clara, CA (US); Jihee Kim, Mountain View, CA (US); Bo Li, San Jose, CA (US); Anthony S. Liot, Cupertino, CA (US); Lu Luo, Mountain View, CA (US); Pranav K. Mistry, Saratoga, CA (US); Zhihan Ying, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 15/875,393

(22) Filed: Jan. 19, 2018

(65) Prior Publication Data

US 2018/0204061 A1    Jul. 19, 2018

Related U.S. Application Data

(60) Provisional application No. 62/472,497, filed on Mar. 16, 2017, provisional application No. 62/448,325,
(Continued)

(51) Int. Cl.
*G06K 9/00* (2006.01)
*H04L 29/08* (2006.01)
(Continued)

(52) U.S. Cl.
CPC ...... *G06K 9/00671* (2013.01); *G06F 11/3055* (2013.01); *G06F 11/3433* (2013.01);
(Continued)

(58) Field of Classification Search
None
See application file for complete search history.

(56) References Cited

U.S. PATENT DOCUMENTS 7,565,139 B2    7/2009   Neven, Sr. et al.
7,953,693 B2    5/2011   Smith et al.
(Continued)

FOREIGN PATENT DOCUMENTS

KR    10-2009-0090613        8/2009
KR    10-1191913 B1          10/2012
(Continued)

OTHER PUBLICATIONS

International Search Report and Written Opinion dated Apr. 16, 2018 for International Application PCT/KR2018/000853 from Korean Intellectual Property Office, pp. 1-14, Republic of Korea.
(Continued)

*Primary Examiner* — Chan S Park
*Assistant Examiner* — Elisa M Rice
(74) *Attorney, Agent, or Firm* — Sherman IP LLP; Kenneth L. Sherman; Hemavathy Perumal

(57) ABSTRACT

One embodiment provides a method comprising classifying one or more objects present in an input comprising visual data by executing a first set of models associated with a domain on the input. Each model corresponds to an object category. Each model is trained to generate a visual classifier result relating to a corresponding object category in the input with an associated confidence value indicative of accuracy of the visual classifier result. The method further comprises aggregating a first set of visual classifier results based on
(Continued)

confidence value associated with each visual classifier result of each model of the first set of models. At least one other model is selectable for execution on the input based on the aggregated first set of visual classifier results for additional classification of the objects. One or more visual classifier results are returned to an application running on an electronic device for display.

20 Claims, 23 Drawing Sheets

Related U.S. Application Data filed on Jan. 19, 2017, provisional application No. 62/448,339, filed on Jan. 19, 2017.

(51) Int. Cl.

| | | |
|---|---|---|
| G06T 19/00 | (2011.01) | |
| G06N 20/00 | (2019.01) | |
| G06N 3/08 | (2006.01) | |
| G06K 9/62 | (2006.01) | |
| G06F 11/30 | (2006.01) | |
| H04L 29/06 | (2006.01) | |
| G06F 11/34 | (2006.01) | |
| G06N 5/02 | (2006.01) | |
| G06T 11/00 | (2006.01) | |
| G06K 9/32 | (2006.01) | |
| G06K 9/66 | (2006.01) | |
| G06F 3/14 | (2006.01) | |

(52) U.S. Cl.
CPC ...... *G06F 11/3438* (2013.01); *G06K 9/00221* (2013.01); *G06K 9/3241* (2013.01); *G06K 9/6256* (2013.01); *G06K 9/6262* (2013.01); *G06K 9/6282* (2013.01); *G06K 9/66* (2013.01); *G06N 3/08* (2013.01); *G06N 5/025* (2013.01); *G06N 20/00* (2019.01); *G06T 11/00* (2013.01); *G06T 19/006* (2013.01); *H04L 67/22* (2013.01); *H04L 67/38* (2013.01); *G06F 3/14* (2013.01); *G06K 9/6292* (2013.01)

(56) References Cited

U.S. PATENT DOCUMENTS

| | | | |
|---|---|---|---|
| 8,185,523 B2 | 5/2012 | Lu et al. | |
| 8,229,948 B1 | 7/2012 | Ershov | |
| 8,379,990 B2 | 2/2013 | Nitta | |
| 8,788,517 B2 | 7/2014 | Horvitz et al. | |
| 8,990,199 B1 | 3/2015 | Ramesh et al. | |
| 9,230,172 B2 | 1/2016 | Holzschneider et al. | |
| 9,235,634 B2 | 1/2016 | Georgakis et al. | |
| 9,412,361 B1 | 8/2016 | Geramifard et al. | |
| 9,443,320 B1 * | 9/2016 | Gaidon | G06K 9/00 |
| 9,535,960 B2 | 1/2017 | Guo et al. | |
| 9,565,512 B2 | 2/2017 | Rhoads et al. | |
| 9,573,277 B2 | 2/2017 | Rosen et al. | |
| 9,576,195 B2 | 2/2017 | Na | |
| 9,875,258 B1 * | 1/2018 | Hsiao | G06F 16/532 |
| 10,235,518 B2 | 3/2019 | Permeh et al. | |
| 2005/0076004 A1 | 4/2005 | Yanagisawa et al. | |
| 2006/0031217 A1 * | 2/2006 | Smith | G06K 9/00711 |
| 2008/0005067 A1 | 1/2008 | Dumais et al. | |
| 2008/0013940 A1 | 1/2008 | Jung et al. | |
| 2008/0147730 A1 | 6/2008 | Lee et al. | |
| 2008/0168070 A1 * | 7/2008 | Naphade | G06F 16/353 |
| 2009/0245573 A1 | 10/2009 | Saptharishi et al. | |
| 2010/0114855 A1 | 5/2010 | Li et al. | |
| 2011/0085739 A1 | 4/2011 | Zhang et al. | |
| 2011/0276562 A1 | 11/2011 | Madden-Woods et al. | |
| 2011/0320454 A1 | 12/2011 | Hill et al. | |
| 2014/0029806 A1 | 1/2014 | Nihei et al. | |
| 2014/0059458 A1 | 2/2014 | Levien et al. | |
| 2014/0201126 A1 * | 7/2014 | Zadeh | G06N 7/005 706/52 |
| 2014/0233800 A1 | 8/2014 | Kis et al. | |
| 2014/0253588 A1 | 9/2014 | Mandala | |
| 2015/0026691 A1 * | 1/2015 | Rastogi | G06F 9/4881 718/102 |
| 2015/0161220 A1 * | 6/2015 | Chen | G06F 16/248 707/722 |
| 2015/0170042 A1 | 6/2015 | Perkowitz et al. | |
| 2015/0213058 A1 | 7/2015 | Ambardekar et al. | |
| 2015/0254510 A1 | 9/2015 | McKinnon et al. | |
| 2015/0347488 A1 | 12/2015 | Peters et al. | |
| 2015/0347525 A1 | 12/2015 | Marlow et al. | |
| 2015/0363409 A1 | 12/2015 | Wood et al. | |
| 2015/0363485 A1 | 12/2015 | Bennett et al. | |
| 2015/0363943 A1 | 12/2015 | Yalniz et al. | |
| 2016/0063692 A1 | 3/2016 | Divakaran et al. | |
| 2016/0070731 A1 | 3/2016 | Chang et al. | |
| 2016/0117862 A1 | 4/2016 | Cardonha et al. | |
| 2016/0171346 A1 | 6/2016 | Han et al. | |
| 2016/0203214 A1 | 7/2016 | Chang et al. | |
| 2016/0217158 A1 | 7/2016 | Watanabe et al. | |
| 2016/0275947 A1 | 9/2016 | Li et al. | |
| 2016/0292507 A1 | 10/2016 | Ghoson et al. | |
| 2016/0379260 A1 | 12/2016 | Balasubramanian et al. | |
| 2018/0005134 A1 | 1/2018 | Kish et al. | |
| 2018/0204059 A1 | 7/2018 | Antol et al. | |

FOREIGN PATENT DOCUMENTS

| | | |
|---|---|---|
| KR | 10-2015-0052306 B1 | 4/2015 |
| KR | 2017-0035506 A | 3/2017 |
| WO | 2011142651 A1 | 11/2011 |

OTHER PUBLICATIONS

International Search Report and Written Opinion dated Apr. 27, 2018 for International Application PCT/KR2018/000738 from Korean Intellectual Property Office, pp. 1-13, Republic of Korea.
U.S. Non-Final Office Action for U.S. Appl. No. 15/841,157 dated Apr. 9, 2019.
Extended European Search Report dated Oct. 29, 2019 for European Application No. 18741395.0 from European Patent Office, pp. 1-10, Munich, Germany.
Extended European Search Report dated Oct. 30, 2019 for European Application No. 18741064.2 from European Patent Office, pp. 1-10, Munich, Germany.
U.S. Final Office Action for U.S. Appl. No. 15/841,157 dated Jan. 10, 2020.
U.S. Advisory Action for U.S. Appl. No. 15/841,157 dated Mar. 19, 2020.
U.S. Non-Final Office Action for U.S. Appl. No. 15/841,157 dated May 1, 2020.
U.S. Notice of Allowance for U.S. Appl. No. 15/841,157 dated Sep. 30, 2020 by Examiner Elisa M. Rice.

* cited by examiner

520

530

540

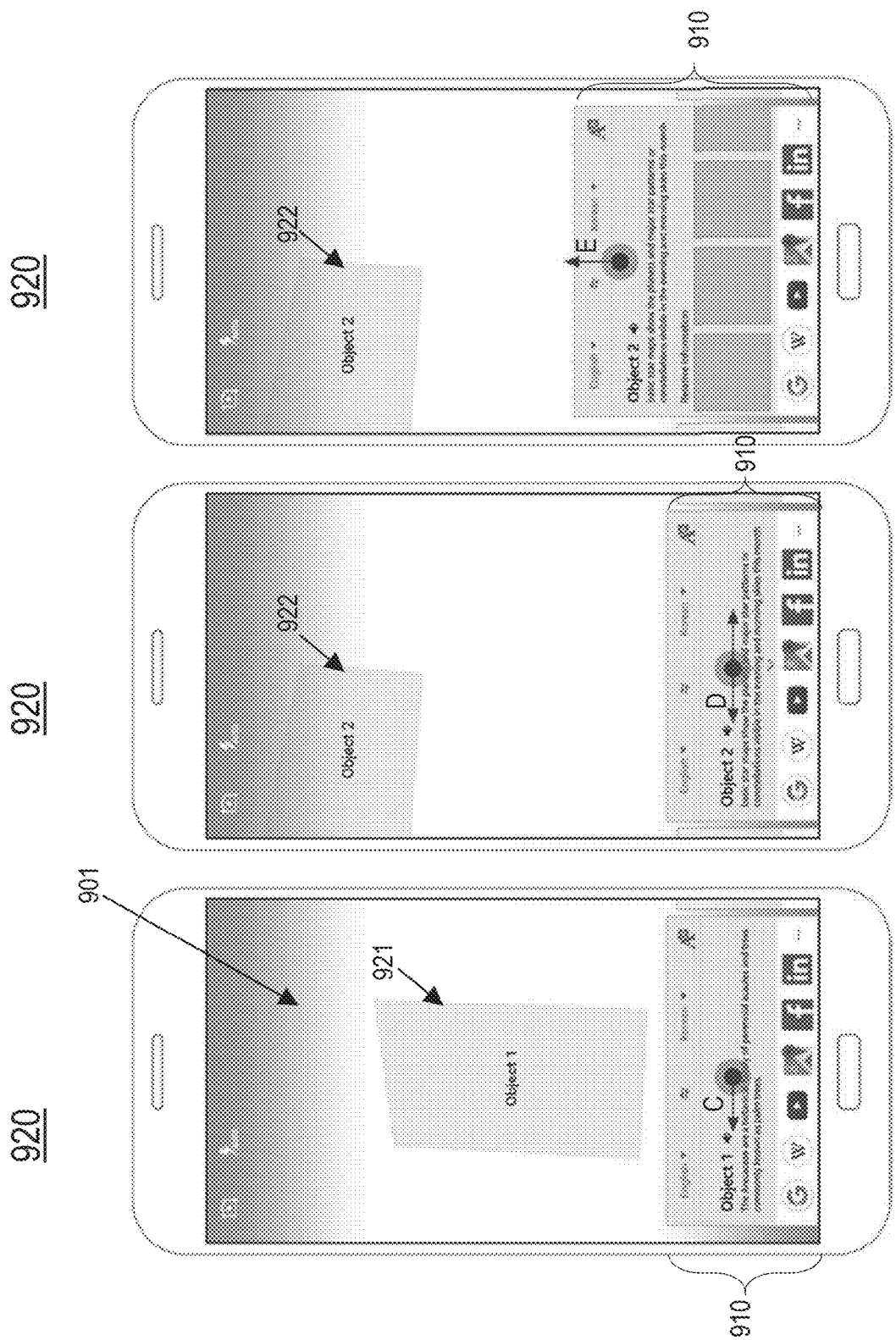

1000

```
┌─────────────────────────────────────────────────────────────┐
│ Classify one or more objects present in an input comprising │
│ visual data by executing a first set of models associated   │
│ with a domain on the input, where each model of the first   │
│ set of models corresponds to an object category, and each   │
│ model is trained to generate a visual classifier result     │
│ relating to a corresponding object category in the input    │
│ with an associated confidence value indicative of accuracy  │
│ of the visual classifier result                             │
└─────────────────────────────────────────────────────────────┘ — 1001
                              ↓
┌─────────────────────────────────────────────────────────────┐
│ Aggregate a first set of visual classifier results based on │
│ confidence value associated with each visual classifier     │
│ result of each model of the first set of models             │
└─────────────────────────────────────────────────────────────┘ — 1002
                              ↓
┌─────────────────────────────────────────────────────────────┐
│ Select a second set of models to execute on the input based │
│ on the aggregated first set of visual classifier results    │
│ and one or more hierarchical relationships between the      │
│ first set of models and one or more other models            │
└─────────────────────────────────────────────────────────────┘ — 1003
                              ↓
┌─────────────────────────────────────────────────────────────┐
│ Determine an execution order of the second set of models    │
│ based on one or more quality of service (QoS) preferences   │
│ and model metadata information corresponding to the second  │
│ set of models                                               │
└─────────────────────────────────────────────────────────────┘ — 1004
                              ↓
┌─────────────────────────────────────────────────────────────┐
│ Execute the second set of models in accordance with the     │
│ execution order                                             │
└─────────────────────────────────────────────────────────────┘ — 1005
```

FIG. 20

VISION INTELLIGENCE MANAGEMENT FOR ELECTRONIC DEVICES

CROSS REFERENCE TO RELATED APPLICATIONS

The present application claims priority to each of the following patent applications: (1) U.S. Provisional Patent Application No. 62/448,339, filed on Jan. 19, 2017, (2) U.S. Provisional Patent Application No. 62/472,497, filed on Mar. 16, 2017, and (3) U.S. Provisional Patent Application No. 62/448,325, filed on Jan. 19, 2017. The patent applications that the present application claims priority to are hereby incorporated by reference in its entirety.

TECHNICAL FIELD

One or more embodiments relate generally to vision intelligence (VI), and in particular VI management for electronic devices.

BACKGROUND

A large number of recognition models (e.g., deep learning models) may be available to an electronic device for use in visual analysis of visual data (e.g., performing object recognition on photos and/or videos). However, due to limited computation resources on the electronic device, it may not be feasible for all models available to the electronic device to be active simultaneously during run-time.

SUMMARY

One embodiment provides a method comprising classifying one or more objects present in an input comprising visual data by executing a first set of models associated with a domain on the input. Each model of the first set of models corresponds to an object category. Each model is trained to generate a visual classifier result relating to a corresponding object category in the input with an associated confidence value indicative of accuracy of the visual classifier result. The method further comprises aggregating a first set of visual classifier results based on confidence value associated with each visual classifier result of each model of the first set of models. At least one other model is selectable for execution on the input based on the aggregated first set of visual classifier results for additional classification of the one or more objects. One or more visual classifier results are returned to an application running on an electronic device for display.

These and other features, aspects and advantages of the one or more embodiments will become understood with reference to the following description, appended claims and accompanying figures.

BRIEF DESCRIPTION OF THE DRAWINGS

FIG. 19A illustrates the application screen displaying a first result card paired with a first object present in the camera view, in one or more embodiments;

FIG. 19B illustrates the application screen displaying a second result card 910 paired with a second object present in the camera view, in one or more embodiments;

FIG. 19C illustrates the application screen displaying an expanded second result card, in one or more embodiments;

FIG. 20 is a flowchart of an example process for processing visual data, in one or more embodiments.

DETAILED DESCRIPTION

Figure 1:
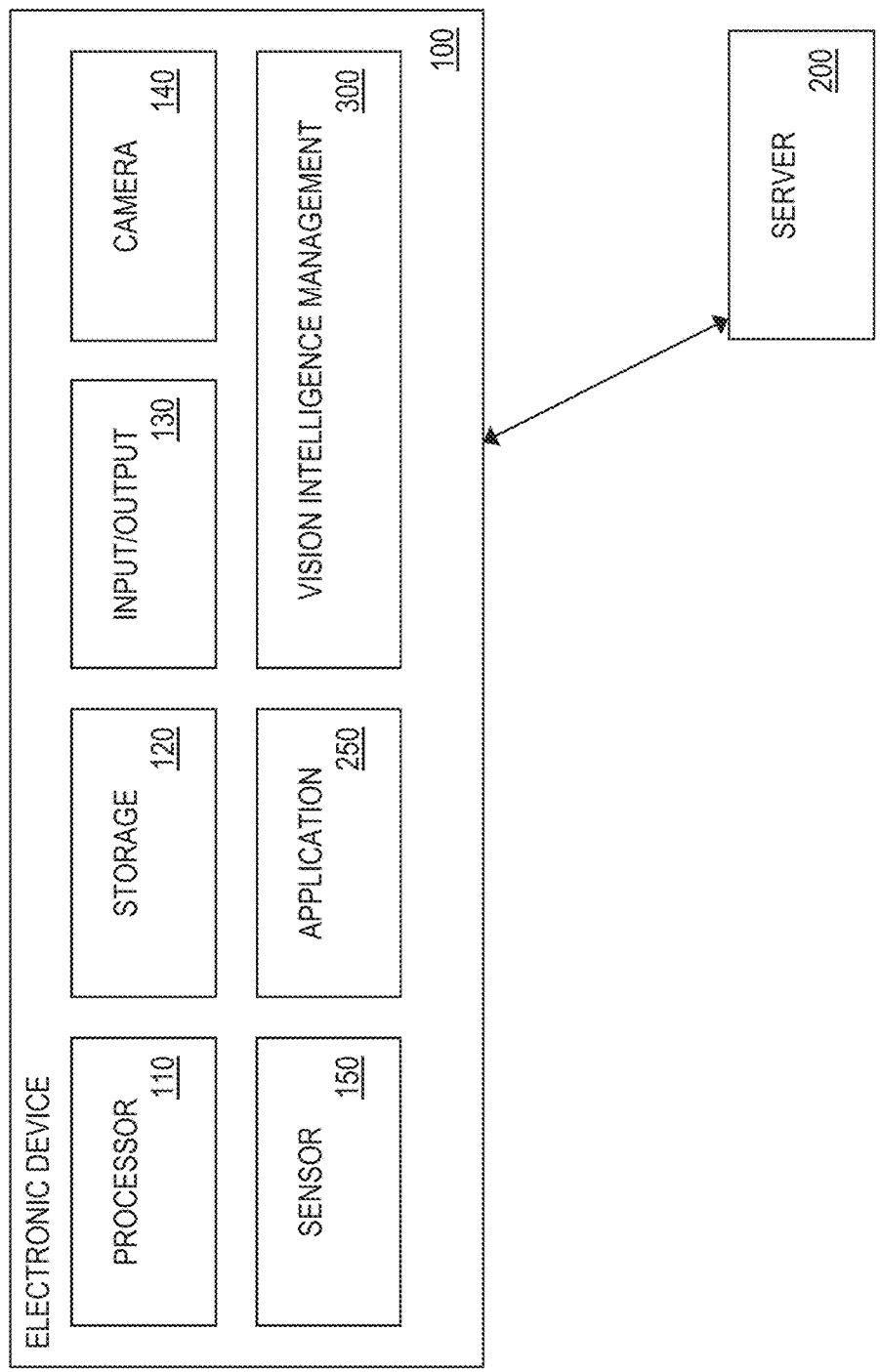
FIG. 1 illustrates an example computing architecture for implementing a vision intelligence (VI) system, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to vision intelligence, and in particular, vision intelligence management for electronic devices. One embodiment provides a method comprising classifying one or more objects present in an input comprising visual data by executing a first set of models associated with a domain on the input. Each model of the first set of models corresponds to an object category. Each model is trained to generate a visual classifier result relating to a corresponding object category in the input with an associated confidence value indicative of accuracy of the visual classifier result. The method further comprises aggregating a first set of visual classifier results based on confidence value associated with each visual classifier result of each model of the first set of models. At least one other model is selectable for execution on the input based on the aggregated first set of visual classifier results for additional classification of the one or more objects. One or more visual classifier results are returned to an application running on an electronic device for display.

For expository purposes, the term "visual data" as used herein generally refers to visual content, such as images, videos, or any other type of visual content that is displayable on a display device (e.g., a television, a monitor, tablet, smartphone, etc.).

For expository purposes, the term "vision processing task" generally refers to a task/operation involving visual analysis of visual data. Examples of different types of vision processing tasks include, but are not limited to, face recognition, scene recognition, object recognition, object localization and segmentation, object tracking, 3D object reconstruction, etc.

With the introduction of new artificial intelligence and computer vision technology in recent years, a camera application and/or a gallery application on an electronic device is evolving into an intelligent tool that, as illustrated in various embodiments, may be used to extract information from the visual domain and provide rich visual context to one or more other applications and services on the electronic device. While the camera application and/or the gallery application are mentioned in one or more embodiments for illustration, ordinary people skilled in the art would appreciate that other types of applications may equally benefit from features of the present invention.

To perform a vision processing task, a camera application on an electronic device may be extended with visual processing functionalities that are based on deep learning (DL) and neural networks. One or more embodiments provide a computer vision (CV) and DL based vision intelligence (VI) framework. The VI framework is an extension and integration framework for VI, enabling deployment of new DL and CV technologies on electronic devices with minimal application change. For example, the VI framework enables different autonomous VI components (e.g., native and/or third party/partner augmented reality applications) to run within a camera application and/or a gallery application on an electronic device, thereby extending visual processing functionalities of the camera application and/or the gallery application. Each VI component has a small footprint, enabling simple integration with the camera application and/or the gallery application. The VI framework extends visual processing functionalities of a mobile camera or other types of sensing circuits of the electronic device, enabling the mobile camera or the other types of sensing circuits to become an intelligent camera or sensing circuits instead of just a tool for capturing visual data. For example, the mobile camera may become a source of VI if the VI components support one or more of the following visual processing functionalities: (1) object recognition (i.e., identifying different types of objects in a visual field, such as a car), (2) determining attributes and relationships between objects (e.g., in response to identifying a sports car and a road in a visual field, determining that the sports car is being driven on the road), and (3) recognizing attributes of particular objects (e.g., a car belonging to a particular individual).

In one embodiment, the VI components form an open architecture engendering a component ecosystem in which different communities (e.g., research communities), device vendors, users, third parties or partners may provide deep learning models associated with visual processing functionalities.

In one embodiment, the VI components are sandboxed to isolate the camera application and/or the gallery application from one or more failures of the VI components.

In one embodiment, the VI framework enables load balancing opportunities for power optimization and resource utilization that allow the VI components to benefit from new forms of software acceleration or hardware acceleration (e.g., GPU, FPGA, special purpose neural net processing units) without changes to the camera application and/or the gallery application, thereby facilitating a high-degree of modularization.

In one embodiment, the VI framework provides support for both on-device and on-cloud components and hybrid architectures that combine on-device and on-cloud processing of visual data.

As DL and CV technologies are rapidly changing, the VI framework allows rapid integration of current and emerging vision technologies with mobile applications and services. Each VI component may be dynamically added, removed, activated, deactivated, or upgraded.

FIG. 1 illustrates an example computing architecture 10 for implementing a VI management system 300, in one or more embodiments. The computing architecture 10 comprises an electronic device 100 including computation resources, such as one or more processors 110 and one or more storage units 120. One or more applications 250 may execute/operate on the electronic device 100 utilizing the computation resources of the electronic device 100.

Examples of an electronic device 100 include, but are not limited to, a mobile electronic device such as a tablet, a smart phone, a laptop, a smart watch, etc.

In one embodiment, the electronic device 100 comprises a camera 140 integrated in or coupled to the electronic device 100. One or more applications on the electronic device 100 may utilize the camera 140 to capture visual data (e.g., photos, video) of an object presented to the camera 140.

In one embodiment, the one or more applications 250 on the electronic device 100 include, but are not limited to, one or more visual data acquiring applications and/or one or more components acquiring VI. Examples of different visual data acquiring applications include, but are not limited to, a camera application 161 (FIG. 4) for capturing visual data utilizing the camera 140, a gallery application 162 (FIG. 4) for offline storage of visual data captured by the camera 140 or received from other sources. Examples of different components for VI include, but are not limited to, an object recognition application for classifying one or more objects present in an image/video frame, a scene recognition application for classifying one or more scenes present in an image/video frame, a car recognition application for classifying one or more cars present in an image/video frame, a third party application for customizing an online service offered by a third party based on visual data (e.g., a shopping application for providing online shopping recommendations based on one or more objects present in an image/video frame, a nutrition/diet application for providing nutrition/diet information based on one or more food items present in an image/video frame, a store/restaurant locator application for providing store/restaurant recommendations based on one or more food items present in an image/video frame, etc.), an object localization and segmentation application for detecting where one or more objects present in an image/video frame are located, an object tracking application for object tracking one or more objects over a series of image/video frames, etc.

In one embodiment, an application 250 may be pre-loaded onto or downloaded to the electronic device 100. An application 250 may originate from a device vendor (e.g., an original equipment manufacturer (OEM)) of the electronic device 100 (i.e., a vendor application) or originate from a third party (e.g., a community, a user, a partner).

As described in detail later herein, the VI management system 300 provides a set of APIs and components for VI that allow application developers to enhance existing applications 250 and build new applications 250 that leverage processing of and understanding of visual data. The VI management system 300 provides an extension and integration framework for VI that enables one or more components for VI to run within one or more visual data acquiring applications to extend visual processing functionalities of the visual data acquiring applications, such as object recognition or face recognition.

In one embodiment, the electronic device 100 may further include one or more additional sensors 150 other than the camera 140, such as, but not limited to, one or more position sensors (e.g., GPS) for determining a location of a user of the electronic device 100, one or more audio sensors (e.g., microphone) for detecting user vocalizations (i.e., speech) and features of audio environment (e.g., noisy, quiet, etc.), one or more speech recognition systems for detecting spoken words, one or more text analysis systems for determining user sentiments (e.g., angry, happy, etc.), interests and intent, and one or more data analysis engines for determining information about user preferences and intent based on data collected on the electronic device 100 (e.g., application usage, search history, contacts, etc.). A sensor 150 may be utilized by an application 250 to capture sensor-based contextual information.

In one embodiment, the electronic device 100 comprises one or more input/output (I/O) units 130 integrated in or coupled to the electronic device 100, such as a keyboard, a keypad, a touch interface, or a display screen.

In one embodiment, the electronic device 100 is configured to exchange data with one or more remote servers 200 or remote electronic devices over a connection (e.g., a wireless connection such as a WiFi connection or a cellular data connection, a wired connection, or a combination of the two). For example, a remote server 200 may be an online platform for hosting one or more online services (e.g., an image and video hosting website) and/or distributing one or more applications (e.g., an application 250).

Figure 2:
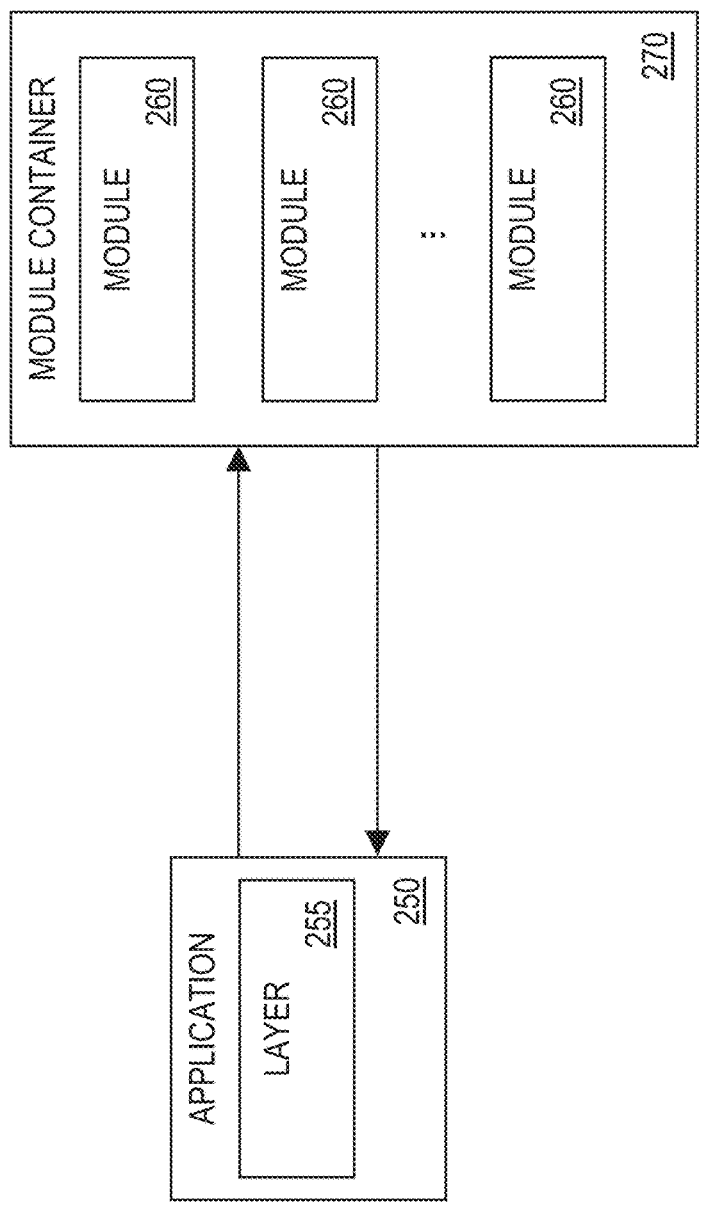
FIG. 2 illustrates an example application hosting a presentation layer, in one or more embodiments.

FIG. 2 illustrates an example application 250 hosting a presentation layer 255, in one or more embodiments. A module 260 is a software abstraction configured to perform a particular vision processing task (e.g., object recognition, object localization and segmentation, scene recognition, car recognition, object tracking, etc.). In an embodiment, a module 260 is configured to: (1) receive, as input, visual data comprising one or more image/video frames, process the visual data based on a visual processing algorithm (e.g., an object recognition algorithm), and generate a corresponding visual classifier result (i.e., recognition result) indicative of an outcome of the processing (e.g., a classification label for an object present in the visual data, such as "dog"). A module 260 may also rely on additional inputs, such as sensor-based contextual information captured by one or more sensors 150 of the electronic device 100, or device information associated with the electronic device 100.

An application 250 may utilize one or more modules 260 to perform one or more desired vision processing tasks. To allow simple integration of one or more modules 260 with an application 250, in one embodiment, the VI management system 300 provides the application 250 with one or more presentation layers 255 to host. Each presentation layer 255 is a plug-in mechanism comprising a small, embeddable application configured to handle communication with one or more modules 260 running in one or more module containers 270.

In one embodiment, a presentation layer 255 comprises an easy-to-use API for configuration and state management of a module 260 with which a hosting application 250 will communicate via the presentation layer 255. Once the module 260 is configured via the presentation layer 255, the hosting application 250 may register a listener for receiving a visual classifier result returned from the module 260. The module 260 may return the visual classifier result to either the presentation layer 255 or directly to the hosting application 250 itself.

In one embodiment, a presentation layer 255 includes a user interface (UI) element and associated application logic for utilizing a module 260 to process visual data, and displaying a visual classifier result returned by the module 260 after processing.

In one embodiment, a module 260 may be configured for a video streaming operation or a single shot operation. A video streaming operation involves a visual data acquiring application, such as the camera application 161 or the gallery application 162, continuously passing live image/video frames or recorded image/video frames to a module 260 as input for processing. A single shot operation involves a visual data acquiring application, such as the camera application 161 or the gallery application 162, passing a single image/video frame to a module 260 as input for processing.

In one embodiment, one or more modules 260 are autonomous, such that each module 260 runs in its own module container 270. This has the benefit of reducing launch time of the hosting application 250 and also ensures that the hosting application 250 remains running should the one or more modules 260 fail. Further, as a module 260 may have significant resource demands (e.g., significant memory and/or processing requirements), sandboxing the one or more modules 260 is important to preserve integrity and reliability of the hosting application 250, particularly if the hosting application 250 is a visual data acquiring application such as the camera application 161 or the gallery application 162.

In one embodiment, isolating a hosting application 250 from one or more modules 260 is achieved by running the one or more modules 260 as separate processes. For example, if the hosting application 250 utilizes multiple modules 260, the hosting application 250 hosts multiple presentation layers 255 for launching separate processes for the modules 260 and communicating with the modules 260 through inter-process communication (IPC) and shared memory. With the presentation layers 255, the hosting application 250 need not deal with the modules 260 directly and can easily turn on or off different modules 260.

In one embodiment, a presentation layer 255 may enable a lightweight application by isolating one or more Augmented Reality (AR) modules 260 from the camera application 161. This enables dynamic or selective addition, removal, activation, deactivation, or upgrade of AR modules 260 in relation to the camera application 161. For example, if a view of an office is captured by the camera application 161, a module 260 for object recognition may classify one or more furniture items present, and a different module 260 for scene recognition may classify the scene present as an office space.

A presentation layer 255 has a small footprint (i.e., small size). As such, a presentation layer 255 has little impact on resource utilization of a hosting application 250.

Figure 3:
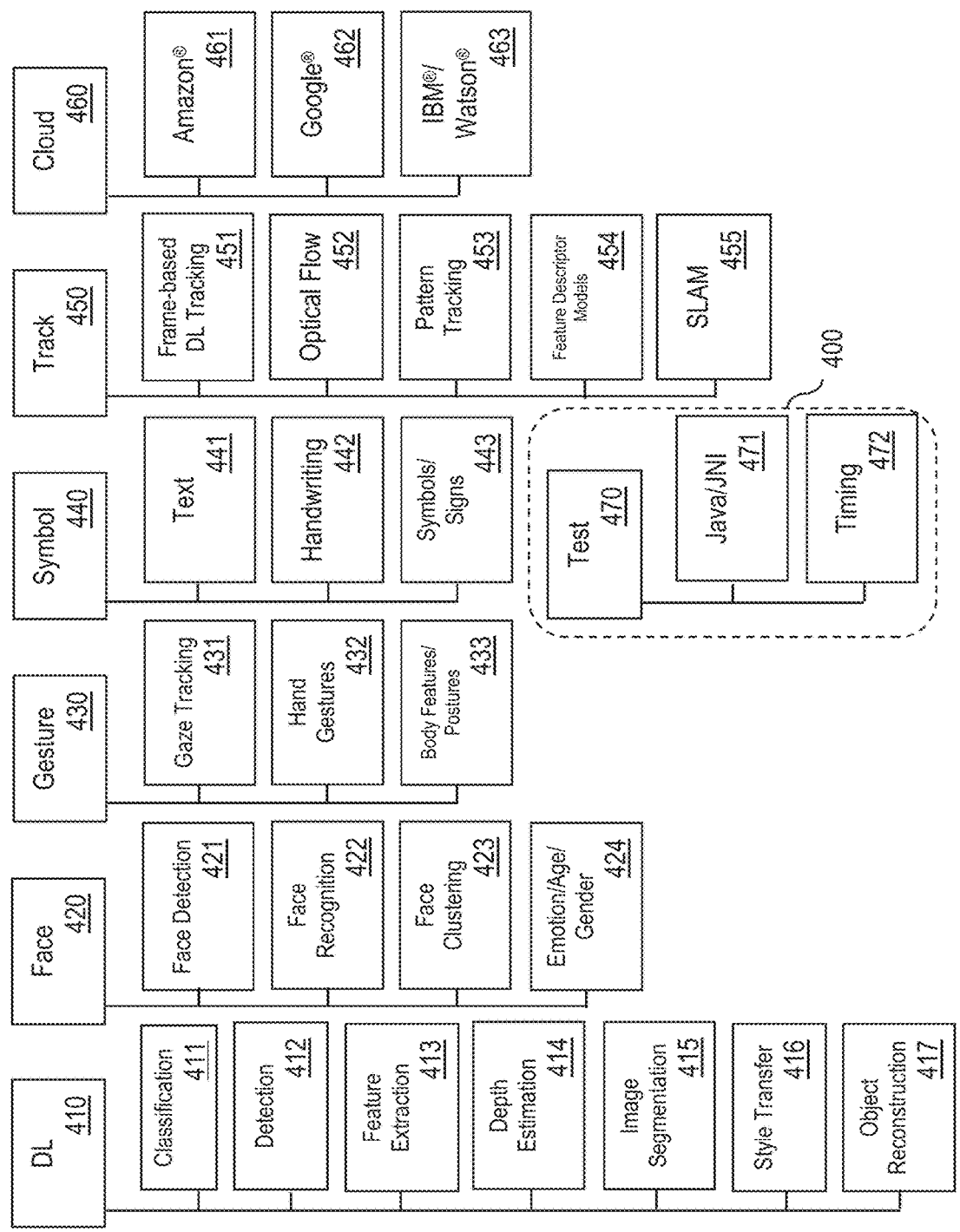
FIG. 3 illustrates example module families, in one or more embodiments.

FIG. 3 illustrates example module families 400, in one or more embodiments. In one embodiment, the VI management system 300 is configured to group available modules 260 into different module families 400. Each module family 400 comprises a set of modules 260 with similar visual processing functionality. For example, a module family 400 may comprise modules 260 associated with a specific problem area, such as object tracking. As another example, a module family 400 may comprises modules 260 associated with a particular technology, such as DL.

As shown in FIG. 3, in one embodiment, the different module families 400 may include, but are not limited to, one or more of the following: (1) a DL module family 410 for DL, (2) a Face module family 420 for facial analysis, (3) a Gesture module family 430 for gesture analysis, (4) a Symbol module family 440 for symbol analysis, (5) a Track module family 450 for object tracking, (6) a Cloud module family 460 for cloud services, and (6) a Test module family 470 for testing.

In one embodiment, the DL module family 410 comprises, but is not limited to, one or more of the following modules 260: (1) a Classification module 411 for classifying one or more objects present in an image/video frame, (2) a Detection module 412 for detecting one or more objects present in an image/video frame, (3) a Feature Extraction module 413 for extracting one or more features from an image/video frame, (4) a Depth Estimation module 414 for determining one or more measurements (e.g., distances) relating to one or more objects present in an image/video frame, (5) an Image Segmentation module 415 for segmenting an image/video frame into multiple segments, (6) a Style Transfer module 416 for recomposing an image/video frame in a style of another image/video frame (i.e., applying look and feel of one image/video frame to a different image/video frame), and (7) an Object Reconstruction module 417 for capturing a shape and appearance of one or more objects present in an image/video frame (e.g., generating a three-dimensional model of an object).

In one embodiment, the Face module family 420 comprises, but is not limited to, one or more of the following modules 260: (1) a Face Detection module 421 for detecting a face present in an image/video frame, (2) a Face Recognition module 422 for recognizing/identifying a face present in an image/video frame, (3) a Face Clustering module 423 for measuring similarity among faces present in multiple image/video frames, and clustering similar faces into groups, and (4) an Emotion/Age/Gender module 424 for determining at least one of a facial expression of a face present in an image/video frame, an age of the face, or a gender of the face.

In one embodiment, the Gesture module family 430 comprises, but is not limited to, one or more of the following modules 260: (1) a Gaze Object tracking module 431 for object tracking an eye gaze of an individual present in an image/video frame, (2) a Hand Gestures module 432 for detecting and recognizing hand gestures exhibited by an individual present in an image/video frame, and (3) a Body Features/Postures module 433 for detecting and recognizing at least one of body features and body postures exhibited by an individual present in an image/video frame.

In one embodiment, the Symbol module family 440 comprises, but is not limited to, one or more of the following modules 260: (1) a Text module 441 for detecting and recognizing text in visual data, (2) a Handwriting module 442 for detecting and recognizing handwriting in visual data, and (3) a Symbol/Signs module 443 for detecting and recognizing at least one of symbols and signs in visual data.

In one embodiment, the Track module family 450 comprises, but is not limited to, one or more of the following modules 260: (1) a Frame-based DL Object tracking module 451 for frame-based DL object tracking of one or more objects over a series of image/video frames, (2) an Optical Flow module 452 for performing optical flow over a series of image/video frames, (3) a pattern-based Object tracking module 453 for tracking patterns over a series of image/video frames, (4) a Feature Descriptor Models module 454 for detecting and recognizing features over a series of image/video frames, and (5) a simultaneous localization and mapping (SLAM) module 455 for performing SLAM over a series of image/video frames.

In one embodiment, the Cloud module family 460 comprises, but is not limited to, one or more modules 260 that bridge to one or more web-based vision services (e.g., a Microsoft® service, a Baidu® service, etc.). For example, the Cloud module family 460 may comprise an Amazon® module 461 for performing a vision processing task in association with one or more Amazon® services (e.g., providing online shopping recommendations based on one or more objects present in an image/video frame). As another example, the Cloud module family 460 may comprise a Google® module 462 for performing a vision processing task in association with one or more Google® services (e.g., online search results based on one or more objects present in an image/video frame). As another example, the Cloud module family 460 may comprise an IBM®/Watson® module 463 for performing a vision processing task in association with one or more IBM®/Watson® services (e.g., AI services).

In one embodiment, the Test module family 470 comprises, but is not limited to, one or more of the following modules 260: (1) a Java/Java Native Interface (JNI) module 471 for testing Java/JNI code, and (2) a Timing module 472 for testing execution time of one or more processes.

Figure 4:
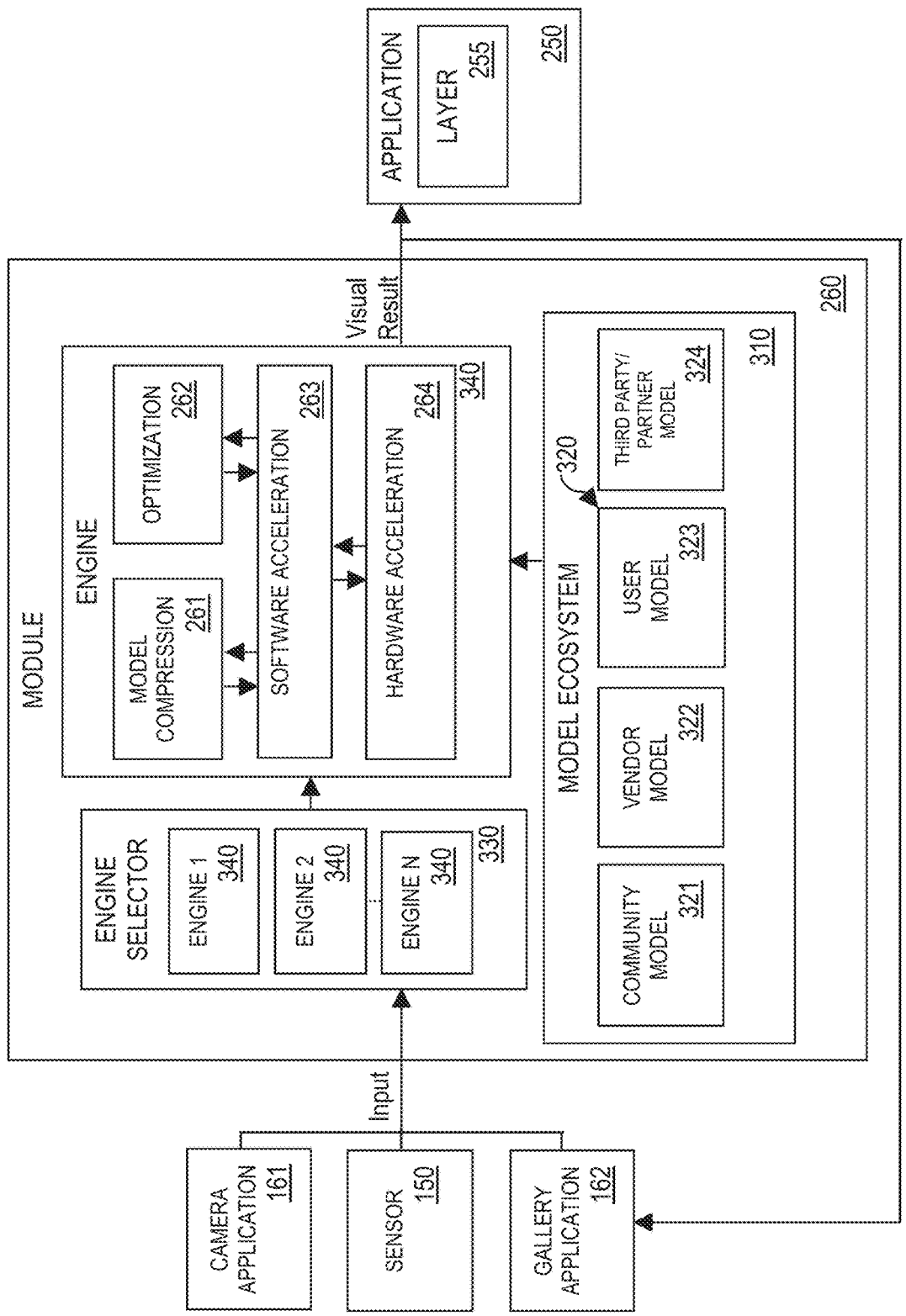
FIG. 4 illustrates an example module in detail, in one or more embodiments.

FIG. 4 illustrates an example module 260 in detail, in one or more embodiments. In one embodiment, a module 260 has an internal structure that includes one or more models 320, one or more engines 340, and an engine selector 330. The module 260 utilizes the one or more models 320 for performing a particular vision processing task. Each model 320 comprises a dataset. In one embodiment, each model 320 is a neural network trained for a specific task (e.g., an image processing task, such as face recognition).

In one embodiment, the module 260 comprises a model ecosystem 310 maintaining different types of models 320 available for the module 260 to utilize. The model ecosystem 310 provides run-time binding of the module 260 with one or more models 320, and high-level configuration APIs that allow provisioning of different types of models 320 from different sources. For example, the model ecosystem 310 may include, but are not limited to, one or more of the following: (1) one or more community models 321, wherein each community model 321 is developed by a research community and is freely available, (2) one or more vendor models 322, wherein each vendor model 322 is developed by a device vendor (e.g., an OEM) of the electronic device 100 and is only available to run on electronic devices from the device vendor or licensed by the vendor, (3) one or more user models 323, wherein each user model 323 is developed based on user data (e.g., a user model 323 trained based on a user's collection of images/videos to identify friends or family members of the user), and (4) one or more third party/partner models 324, wherein each third party/partner model 324 is developed by a third party and is available through partnership or licensing.

The module 260 is configured to receive, as input, visual data from a visual data acquiring application on the electronic device 100, such as one or more camera images/videos from the camera application 161 or one or more gallery images/videos from the gallery application 162. The module 260 is also configured to receive one or more additional inputs, such as sensor-based contextual information from one or more sensors 150 of the electronic device 100, or device information associated with the electronic device 100.

In one embodiment, the module 260 comprises a model compression unit 261 configured to compress a model 320 utilized by the module 260. In one embodiment, the module 260 comprises an optimization unit 262 configured to optimize power optimization and resource utilization for load balancing. In one embodiment, the module 260 comprises a software acceleration unit 263 configured to determine whether the model 320 benefits from software acceleration (e.g., single instruction, multiple data (SIMD), Open Multi-Processing (OpenMP), etc.). In one embodiment, the module 260 comprises a hardware acceleration unit 264 configured to determine whether the model 320 benefits from hardware acceleration (e.g., central processing unit (CPU), graphics processing unit (GPU), field-programmable gate array (FPGA), etc.).

In one embodiment, the module 260 comprises an engine selector 330 configured to select an engine 340 from a collection of available engines 340 (e.g., Engine 1, Engine 2, . . . , and Engine N) for running the module 260. Each available engine 340 comprises a software activity running, or capable of running, the module 260. The engine selector 330 provides load balancing and resource management for hosting applications 250 with multiple modules 260 and/or multiple models 320.

In one embodiment, each model 320 may be supported by an engine 340. Each engine 340 may support one or more models 320.

In one embodiment, an application developer of the module 260 may control which engines 340 are associated with the module 260 based on requirements and/or parameters of a model 320 utilized by the module 260. In one embodiment, the engine selector 330 is configured to select an appropriate engine 340 from a collection of available engines 340 that an application developer of the module 260 has associated with the module 260.

In another embodiment, the engine selector 330 is configured to automatically select one or more engines 340 to associate with a module 260. Specifically, the engine selector 330 is configured to: (1) dynamically determine one or more associations between the module 260 and one or more engines 340 of a collection of available engines 340 based on run-time data, and (2) select an appropriate engine 340 from the collection of available engines 340 for running the module 260 based on the one or more associations determined. The ability to dynamically determine an association between the module 260 and an engine 340 removes the requirement for a pre-determined fixed association between the module 260 and the engine 340 (e.g., a fixed association provided by an application developer of the module 260). As described in detail later herein, this flexibility allows the module 260 to run on different types of engines 340, such as third party engines, based on information such as ontology, specifics of the module 260, contextual information relating to operation of the module 260, etc.

After running the module 260 utilizing a model 320 on an engine 340 selected by the engine selector 330, a visual classifier result generated by the module 260 may be forwarded to one or more presentation layers 255 hosted in one or more applications 250 or directly to the one or more applications 250. For example, the visual classifier result may be forwarded to one or more of the following: (1) a visual data acquiring application on the electronic device 100, such as the gallery application 162, or (2) a VI component or a presentation layer hosted in the VI component.

As another example, assume the VI management system 300 receives, from a module 260 utilizing a model 320 for object recognition, a visual classifier result identifying an animal captured in visual data. As described in detail later herein, based on an ontology of models 320, the VI management system 300 may run the same module 260 again, or a different module 260, utilizing a different model 320 for additional information related to the animal identified, such as geographical areas where the animal is prevalent.

In one embodiment, a user (e.g., a user of the electronic device 100) may select a module 260 to perform a particular vision processing task on visual data. In another embodiment, an application 250 is configured to select one or more modules 260 to activate to perform a particular vision processing task.

Figure 5:
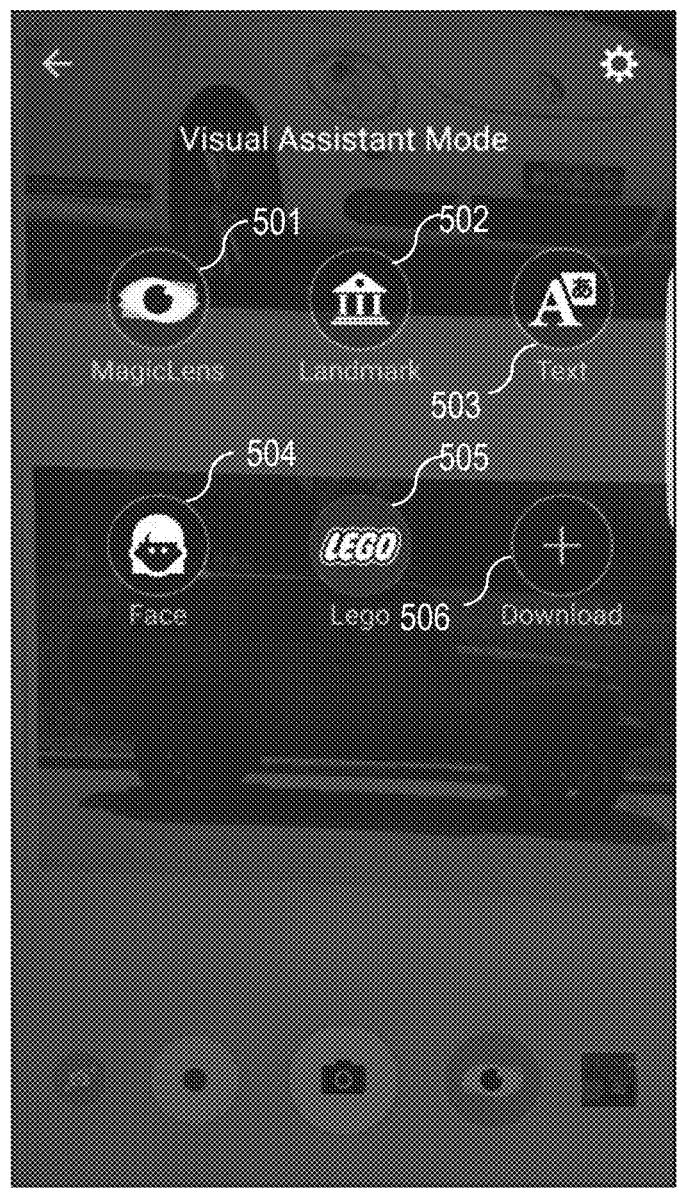
FIG. 5 illustrates an example application screen for the camera application, in one or more embodiments.

FIG. 5 illustrates an example application screen 500 for the camera application 161, in one or more embodiments. In one embodiment, the camera application 161 is an AR camera application providing a virtual assistant that makes full use of the VI system 200. The virtual assistant has one or more installed AR operating modes that provide information about content of images/videos captured live via the camera 140 or stored in the gallery application 162. Each installed AR operating mode is configured to perform a particular vision processing task and corresponds to a presentation layer 255 hosted in the camera application 161 running one or more modules 260 for the vision processing task. For example, the one or more installed AR operating modes may include, but are not limited to, one or more of the following: (1) a MagicLens operating mode corresponding to a first presentation layer 255 hosted in the camera application 161 running one or more modules 260 of the DL module family 410 for object recognition, (2) a Landmark operating mode corresponding to a second presentation layer 255 hosted in the camera application 161 running one or more modules 260 of the Cloud module family 460 for landmark/location recognition (i.e., identifying a landmark or location present in an image/video frame), (3) a Text operating mode corresponding to a third presentation layer 255 hosted in the camera application 161 running one or more modules 260 of the Symbol module family 440 for text recognition, (4) a Face operating mode corresponding to a fourth presentation layer 255 hosted in the camera application 161 running one or more modules 260 of the Face module family 420 for face recognition, and (5) one or more third party operating modes, wherein each third party operating mode is customized/provided by a third party and corresponds to a fifth presentation layer 255 hosted in the camera application 161 running one or more modules 260 of the Track module family 450 for object tracking one or more objects present in image/video frames.

In one embodiment, the MagicLens operating mode is configured to run a first set of models 320 (i.e., base models) and, based on visual classifier results returned by the first set of models 320, activating and running one or more additional models 320.

As shown in FIG. 5, in one embodiment, the camera application 161 presents a user with an application screen 500 comprising one or more selectable graphical user interface (GUI) elements corresponding to the one or more installed AR operating modes for user selection. For example, as shown in FIG. 5, the application screen 500 may include, but is not limited to, one or more of the following GUI elements: (1) a first GUI element 501 corresponding to the Magic Lens operating mode, (2) a second GUI element 502 corresponding to the Landmark operating mode 502, (3) a third GUI element 503 corresponding to the Text operating mode 503, (4) a fourth GUI element 504 corresponding to the Face operating mode, and (5) a fifth GUI element 505 corresponding to a particular third party operating mode. In one embodiment, the application screen 500 further comprises a selectable GUI element 506 that provides the user with an option of downloading and installing one or more additional AR operating modes in the camera application 161.

In one embodiment, the camera application 161 together with the VI management system 300 functions as a real-world browser, extending the capabilities of the camera application beyond just capturing images and videos. The camera application 161 connects a user's digital world to the real world, allowing the user to search, explore and learn more about content and context of objects, scenes, people and experiences present in visual data directly within the camera application 161.

In one embodiment, the ability to install and download additional AR operating modes enables an AR application ecosystem that allows partners and application developers to provide new and updated AR applications to users of the electronic device 100.

In one embodiment, the camera application 161 together with the VI management system 300 provides a mobile eCommerce channel for transactions via a mobile payment and digital wallet service provided by a device vendor of the electronic device 100 and/or one or more third party mobile payment and digital wallet services.

In one embodiment, the camera application 161 together with the VI management system 300 functions as an intelligent vision memory service that remember what a user has seen or interacted with via the camera application 161 and/or the gallery application 162, and recommends and retrieves content and context of objects, scenes, people and experiences present in visual data on commands of the user.

Figure 6:
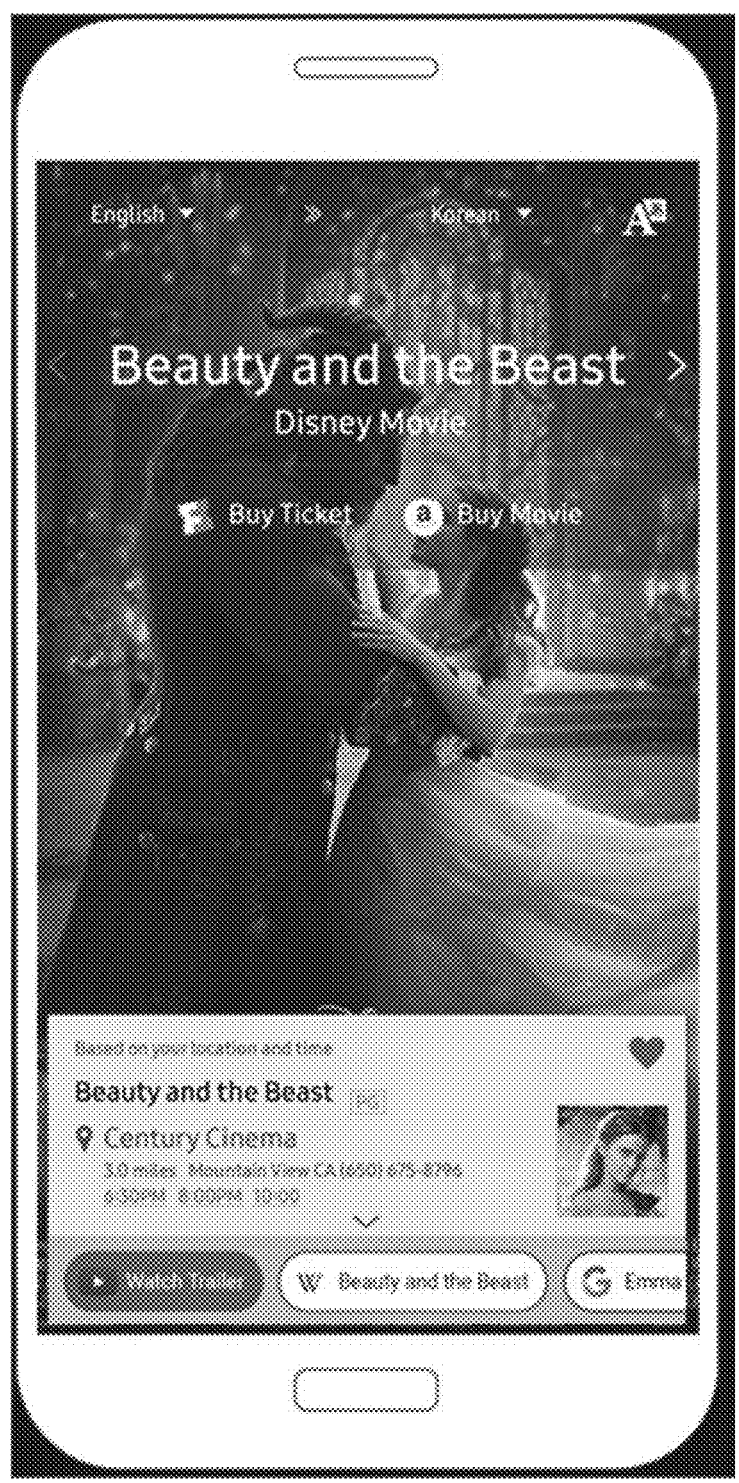
FIG. 6 illustrates another example application screen for the camera application, in one or more embodiments.

FIG. 6 illustrates another example application screen 510 for the camera application 161, in one or more embodiments. Assume when a user of the electronic device 100 is utilizing the camera application 161, the VI management system 300 receives sensor-based contextual information comprising location data captured by a GPS of the electronic device 160, wherein the location data indicates that the user is at a movie theatre. A presentation layer 255 hosted in the camera application 161 may run a module 260 for poster recognition to process a poster within a camera view of the camera 140 to identify a movie that the poster corresponds to. As shown in FIG. 6, in response to receiving a visual classifier result indicative of the movie identified from the module 260, the camera application 161 may present an application screen 510 to the user, wherein the application screen 510 displays the visual classifier result (i.e., name of the movie identified) and provides the user with an option of invoking a third party application for purchasing movie tickets for the movie identified.

Figure 7:
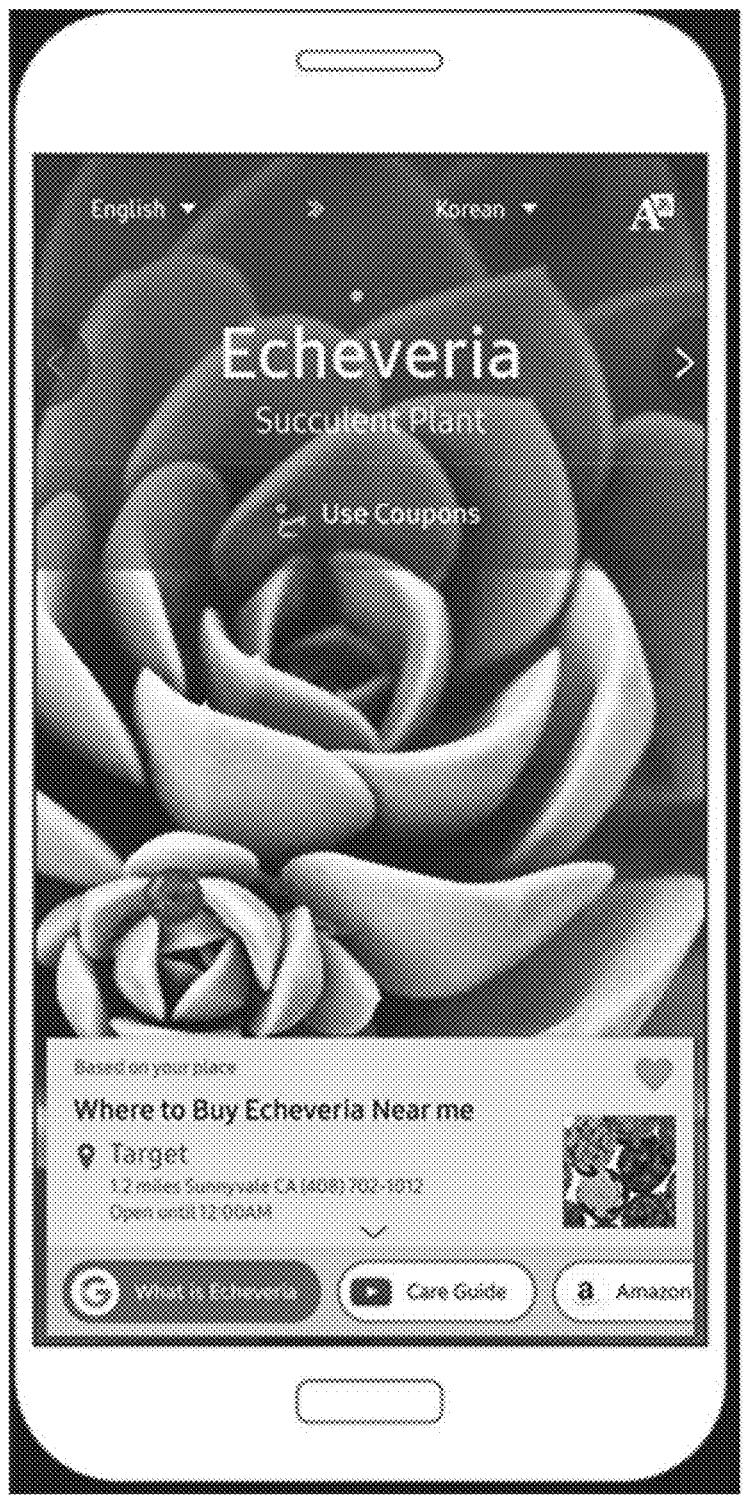
FIG. 7 illustrates another example application screen for the camera application, in one or more embodiments.

FIG. 7 illustrates another example application screen 520 for the camera application 161, in one or more embodiments. Assume a user captures via the camera application 161 or selects from the gallery application 162 an image of a plant. A presentation layer 255 hosted in the camera application 161 may run a module 260 for object recognition to identify a type of plant present in the image. As shown in FIG. 7, in response to receiving a visual classifier result indicative of the type of plant identified (e.g., a succulent plant) from the module 260, the camera application 161 may present an application screen 520 to the user, wherein the application screen 520 displays the visual classifier result (i.e., the type of plant identified) and provides the user with additional information related to the image, such as, but not limited to, a location of a store where the user may buy the plant, a guide for taking care of the plant, a third party application the user may utilize for purchasing the plant online, and another third party application the user may utilize for providing coupons when purchasing the plant online or in-person.

Figure 8:
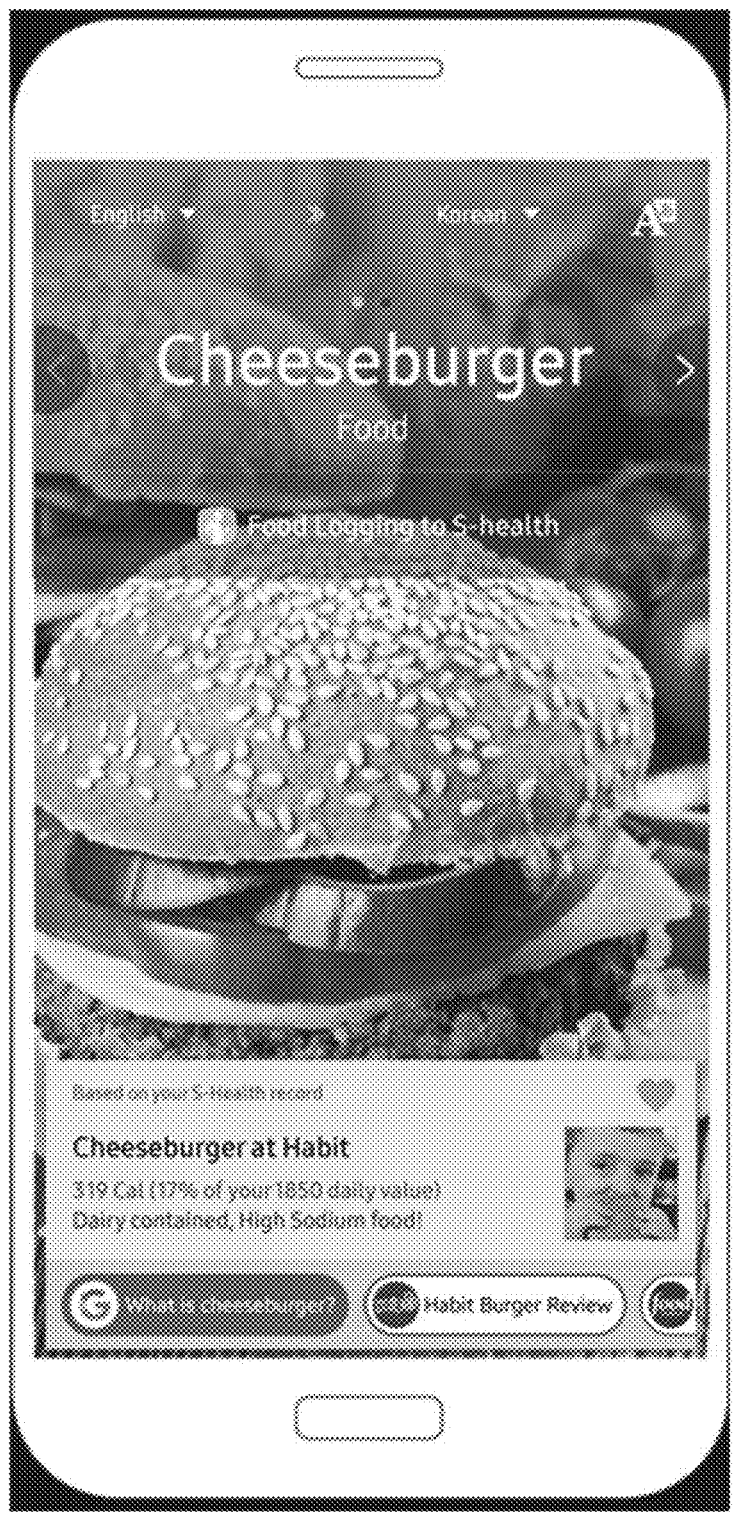
FIG. 8 illustrates another example application screen for the camera application, in one or more embodiments.

FIG. 8 illustrates another example application screen 530 for the camera application 161, in one or more embodiments. Assume a user captures via the camera application 161 or selects from the gallery application 162 an image of a food item. A presentation layer 255 hosted in the camera application 161 may run a module 260 for object recognition to identify a type of food item present in the image. As shown in FIG. 8, in response to receiving a visual classifier result indicative of the type of food item identified (e.g., a cheeseburger) from the module 260, the camera application 161 may present an application screen 530 to the user, wherein the application screen 530 displays the visual classifier result (i.e., the type of food item identified) and provides the user with additional information related to the image, such as, but not limited to, a nutritional information for the food item, online reviews of a restaurant serving the food item, and a third party application the user may utilize for logging the nutritional information into his/her food journal (e.g., a diet/fitness object tracking application).

Figure 9:
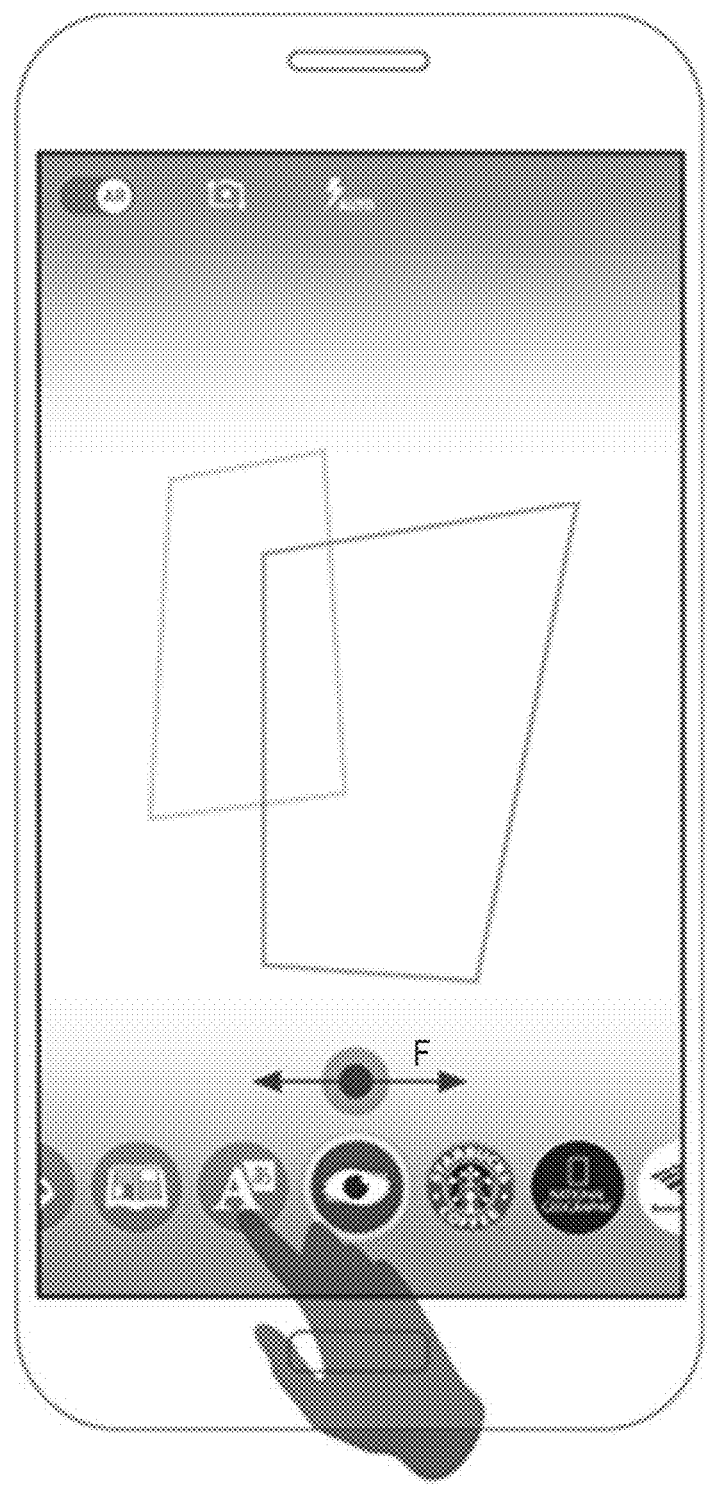
FIG. 9 illustrates another example application screen for the camera application, in one or more embodiments.

FIG. 9 illustrates another example application screen 540 for the camera application 161, in one or more embodiments. In one embodiment, the camera application 161 allows a user to switch between different AR operating modes based on one or more user interactions with the application screen 540. For example, as shown in FIG. 9, the user may browse/scroll through the different AR operating modes using hand gestures (e.g., swiping left or right through different GUI elements corresponding to the different AR operating modes, as illustrated by directional arrow F).

With the VI management system 300, there can be a large number of models 320 present on the electronic device 100.

However, due to limited computation resources on the electronic device 100, it may not be feasible for all models 320 present on the electronic device 100 to be active simultaneously during run-time. In one embodiment, the VI management system 300 provides a functionality for loading/activating or unloading/deactivating one or more models 320 during run-time, thereby providing increased scalability to accommodate large numbers of models 320 that in turn improve recognition capabilities. In one embodiment, the VI management system 300 accommodates running multiple models 320 simultaneously in parallel. In one embodiment, the VI management system 300 accommodates running models 320 on-device (i.e., on the electronic device 100) and on-cloud (i.e., remotely on a server 200, such as a cloud service).

In one embodiment, an application may be deployed on an electronic device in a two-stage process: 1) a learning process in which one or more pre-trained models are created using complex neural network architectures with large amounts of training data, and 2) an inference process in which inference is performed based on a pre-trained model. Specifically, in the inference process, once one or more pre-trained models are available, an application may be developed to use one or more recognition capabilities available from the one or more pre-trained models for analyzing visual data. This may be used to develop one or more AR applications for recognizing a particular set of objects using the one or more pre-trained models. Further, each application is tied to a specific model, and each model may recognize a certain number of object categories based on the training data.

In one embodiment, the VI management system 300 can leverage benefits of performing inference at run-time based on multiple models 320, and also switch models 320 at run-time based on contextual information of a user of the electronic device 100 ("user context"). Examples of user context include, but are not limited to, GPS location, application usage, user intent, etc.

In one embodiment, the VI management system 300 organizes pre-trained models in an intelligent and hierarchical manner based on categories and hierarchical relationships between the categories, wherein each hierarchical relationship (i.e., ontology) may be automatically generated (i.e., automatically derived), pre-defined (i.e., pre-determined), or provided by an application developer/user. A hierarchical tree structure enables recognition of generic/general categories followed by recognition of specific categories triggered by visual classifier results indicative of the generic/general categories. In one embodiment, the VI management system 300 supports adding to, and removing from, at run-time one or more categories with simple modifications/updates to a hierarchical tree structure, thereby providing a scalable and dynamic system architecture with a varying number of categories.

In one embodiment, the VI management system 300 may execute multiple models and/or multiple DL engines either in parallel or in sequence on the same visual data.

In one embodiment, the VI management system 300 allows for different models to be invoked/loaded in the electronic device 100 based on user context. The VI management system 300 may process visual data based on multiple models to gain varying levels of understanding about content and context of objects, scenes, people and experiences present in the visual data. In one embodiment, the VI management system 300 provides flexibility of running specific models using CPU resources of the electronic device 100 and specific models using specialized hardware of the electronic device 100, such as GPU. In one embodiment, the VI management system 300 provides a hybrid approach for recognizing some object categories available on the electronic device 100 and some object categories from the cloud.

A domain is a set of models 320. In this specification, let the term "model graph" generally refer to a directed graph representing a hierarchical tree structure of categories (e.g., object categories). In one embodiment, a model graph comprises multiple category nodes including: (1) a first category node representing a domain root indicative of a domain represented by the model graph, and (2) multiple additional category nodes representing multiple models 320 included in the domain. The model graph further comprises one or more hierarchical links between the multiple category nodes. Each hierarchical link represents a hierarchical relationship between a pair of models. In one embodiment, the model graph may include at least one of the following types of hierarchical links—category ontology links or category similarity links. As described in detail later herein with reference to FIG. 12, a category ontology link between a pair of models is based on ontology information relating to the pair of models. As described in detail later herein with reference to FIG. 14, a category similarity link between a pair of models is based on a similarity metric between the pair of models.

Examples of different types of domains include, but are not limited to, the following: (1) an Everyday domain representing everyday objects and animals recognizable by one or more models 320, (2) a Places domain representing indoor and outdoor locations/landmarks recognizable by one or more models 320, (3) a Cars domain representing car models recognizable by one or more models 320, (4) a Food domain representing food items recognizable by one or more models 320, (5) a Posters domain representing movie/film posters recognizable by one or more models 320, (6) a Sign domain representing American Sign Language recognizable by one or more models 320, (7) an Age domain representing age groups recognizable by one or more models 320, (8) a Gender domain representing gender groups recognizable by one or more models 320, (9) a Logos domain representing brand logos recognizable by one or more models 320, (10) an Emotions domain representing basic user emotions recognizable by one or more models 320, and (11) a Flowers domain representing flower types recognizable by one or more models 320.

Figure 10:
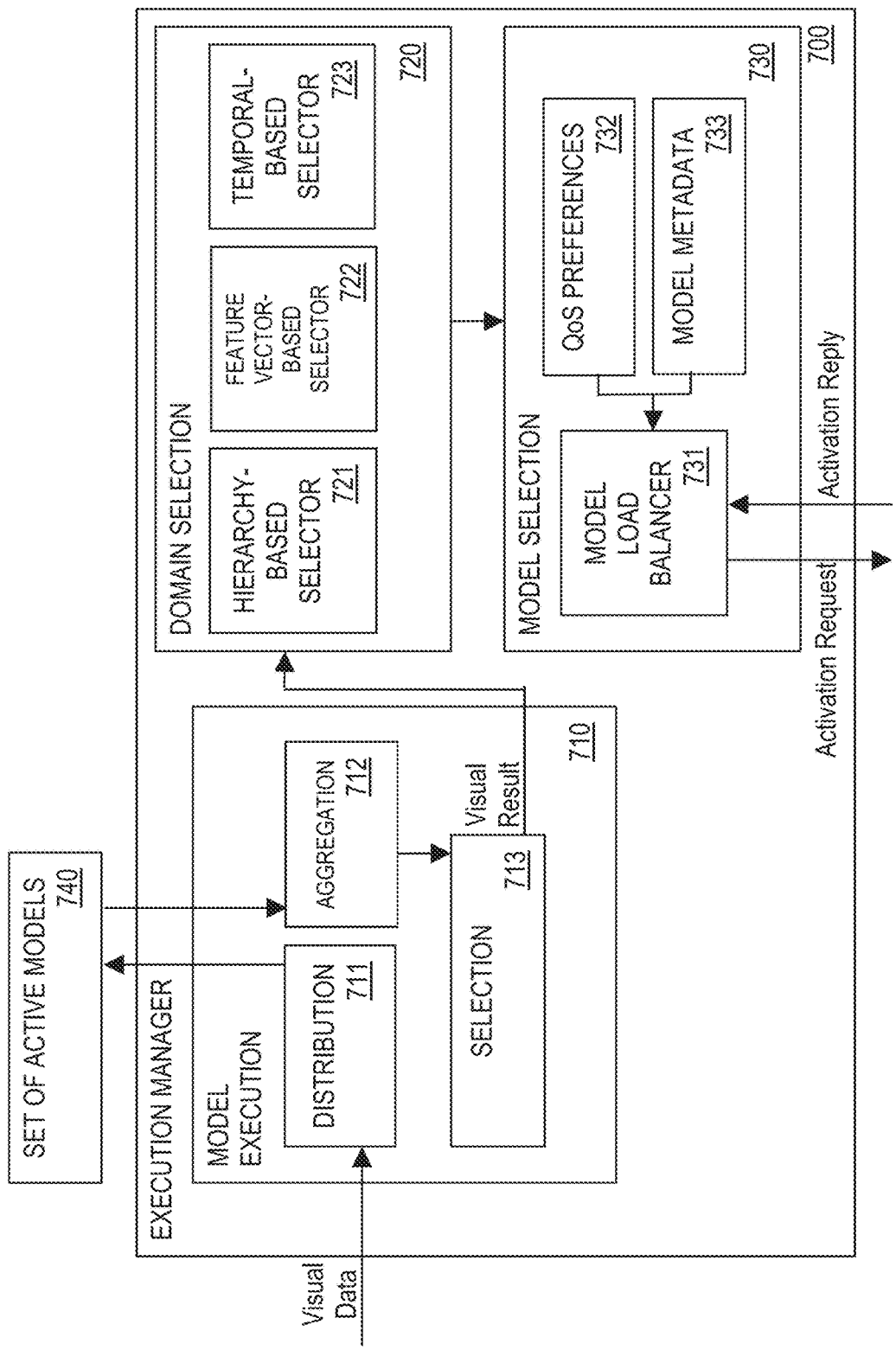
FIG. 10 illustrates an example execution manager, in one or more embodiments.

FIG. 10 illustrates an example execution manager 700, in one or more embodiments. In one embodiment, the VI management system 300 comprises an execution manager 700 for performing inference at run-time based on multiple models 320, and switching models 320 at run-time based on contextual information (i.e., real-time management of models 320 during run-time). The execution manager 700 facilitates parallel model execution in which multiple models 320 are run simultaneously.

As described in detail later herein, in one embodiment, to determine which models 320 to execute during run-time based on context (e.g., user context) and application preferences (e.g., quality of service preferences), the execution manager 700 is configured to perform each of the following: (1) a domain selection process in which a domain suitable for visual data received by the execution manager 700 is selected, and (2) a model selection process in which one or more models 320 included in the selected domain are selected for activation during run-time.

In one embodiment, the execution manager 700 is configured to access, during run-time, a set 740 of active models (i.e., activated/loaded models) 320 maintained by the VI management system 300. An active model 320 is a model 320 that is loaded into a corresponding active engine 340 that is running the active model 320 during run-time. An active engine 340 is an engine 340 that is active during run-time. The set 740 may comprise at least one of a community model 321, a vendor model 322, a user model 323, and a third party/partner model 324.

In one embodiment, the execution manager 700 comprises a model execution system 710 comprising a distribution unit 711 configured to: (1) receive, as input, visual data comprising one or more image/video frames (e.g., from the camera application 161 or the gallery application 162), and (2) forward/pass the visual data to all active engines 340 running the set 740 of active models 320. Each active engine 340 processes the visual data based on at least an active model 320 loaded into the active engine 340, and generates a corresponding visual classifier result indicative of one or more classification labels (e.g., object categories) for one or more objects present in the visual data and/or one or more regions in the visual data where the one or more objects are detected. Each visual classifier result generated may have one or more associated confidence values, wherein each confidence value is indicative of an accuracy of the visual classifier result.

In one embodiment, all the active engines 340 run the active models 320 loaded into the active engines 340 simultaneously, thereby processing the visual data in parallel (i.e., parallel model execution). In another embodiment, the active engines 340 process the visual data sequentially. In yet another embodiment, the active engines 340 process the visual data partially in parallel and partially sequentially.

For example, assume the execution manger 700 is configured to run no more than N active engines 340 in parallel. Further, assume at some point during run-time, M models are required to process visual data, wherein N<M. The execution manager 700 may run the first N models in parallel using N active engines 340, followed by groups of up to N models in parallel until all M models have been run.

In one embodiment, the model execution system 710 comprises an aggregation unit 712 configured to merge/combine all visual classifier results from all the active engines 340 (i.e., result aggregation).

In one embodiment, the model execution system 710 comprises a selection unit 713 configured to: (1) monitor each visual classifier result generated by each active engine 340 to determine when execution is completed, (2) remove duplicate visual classifier results, and (3) remove visual classifier results having associated confidence values that do not meet one or more pre-determined confidence thresholds (i.e., low confidence values).

In one embodiment, the execution manager 700 comprises a domain selection system 720 configured to automatically select a domain suitable for visual data received by the execution manager 700 (i.e., domain selection process), wherein the selected domain includes one or more models 320 that are candidates for activation during run-time. The domain selection system 720 is configured to automatically select a domain in accordance with, but not limited to, one of the following methods: hierarchy-based domain selection method, a feature vector-based domain selection method, or a temporal-based domain selection method.

In one embodiment, the domain selection system 720 comprises a hierarchy-based domain selector 721 configured to apply the hierarchy-based domain selection method. The hierarchy-based domain selection method comprises selecting a domain based on one or more hierarchical relationships (i.e., category ontology links and/or category similarity links) between models 320 included in a hierarchical tree structure. For example, assume a first domain is currently selected for processing the visual data. As an object present in the visual data is recognized by a model 320 included in the first domain, the hierarchy-based domain selector 721 may select a second domain suitable for further processing of the visual data by following a category ontology link or a category similarity link from the first domain to the second domain.

In another embodiment, the domain selection system 720 comprises a feature vector-based domain selector 722 configured to apply the feature vector-based domain selection method. The feature vector-based domain selection method comprises selecting a domain based on one or more feature representations (i.e., feature vectors) extracted from visual data. In one embodiment, for each available domain, the feature vector-based domain selector 722 is configured to determine a corresponding feature representation for the domain and store the feature representation with corresponding metadata information for the domain (e.g., in one or more storage units 120). In response to receiving visual data, the feature vector-based domain selector 722 is configured to, for each image/video frame of the visual data, perform the following: (1) determine a corresponding feature representation for the image/video frame, (2) for each available domain, determine a corresponding distance metric representing a distance between the corresponding feature representation for the image/video frame and a stored feature representation for the domain, and (3) select a domain from the available domains having the smallest distance metric (i.e., having a feature representation that is closest to the corresponding feature representation for the image/video frame).

In another embodiment, the domain selection system 720 comprises a temporal-based domain selector 723 configured to apply the temporal-based domain selection method. The temporal-based domain selection method comprises selecting a domain based on one or more visual classifier results for one or more temporal windows. In one embodiment, for each available domain, the temporal-based domain selector 723 is configured to determine a corresponding feature representation for the domain and store the feature representation with corresponding metadata information for the domain (e.g., in one or more storage units 120). In response to receiving visual data, the temporal-based domain selector 723 is configured to segment the visual data into multiple temporal windows, wherein each temporal window comprises a sequence (i.e., subset) of image/video frames included in the visual data. In one embodiment, the visual data may be segmented into multiple temporal windows based on scene boundaries. For each temporal window, the temporal-based domain selector 723 is configured to perform the following: (1) determine a corresponding feature representation for the temporal window, (2) for each available domain, determine a corresponding distance metric representing a distance between the corresponding feature representation for the temporal window and a stored feature representation for the domain, and (3) select a domain from the available domains having the smallest distance metric (i.e., having a feature representation that is closest to the corresponding feature representation for the temporal window).

In one embodiment, the execution manager 700 comprises a model selection system 730 configured to: (1) receive a selected domain from the domain selection system 720, (2) determine, based on the selected domain, which models 320 to load/activate and unload/deactivate (i.e., model selection) during run-time (i.e., model selection process), and (3) determine, based on the selected domain, which engines 340 to activate or terminate (i.e., engine load balancing) during run-time. The model selection system 730 enhances user convenience as it removes the need for an application developer/user to explicitly select models for activation.

In one embodiment, the model selection system 730 applies a quality of service (QoS) scoring method to select a model from the selected domain to load/activate. Let r generally denote a visual classifier result comprising a classification label n determined using a model m. Let link(m, n) generally denote a set of category ontology links and category similarity links based on the model m and the classification label n. Let m' generally denote a set of models 320 to which link(m, n) points. Let M' generally denote a set of models 320 formed by taking the union of m' over a set of visual classifier results. In one embodiment, the model selection system 730 comprises a model load balancer unit 731 configured to: (1) identify each model 320 in the set M' as a candidate for activation, (2) determine a corresponding execution order for each model 320 in the set M', and (3) coordinate activation of each model 320 in the set M' in accordance with a corresponding execution order.

In one embodiment, the model load balancer unit 731 is configured to determine a corresponding execution order for each model 320 in the set M' based on the following information: (1) QoS preferences information 732, and (2) model metadata information 733. The QoS preferences information 732 may comprise, but is not limited to, one or more of the following: (1) a pre-determined threshold of engines 340 that can be run simultaneously on-device, (2) resource requirements of engines 340 and models 320 (e.g., memory and special hardware, such as the GPU), and (3) current activations of active models 320 currently loaded into the active engines 340, where some models 320 may need to remain active while others may be taken "offline" (i.e., deactivated/unloaded). The model metadata information 733 may comprise, but is not limited to, one or more of the following: (1) model priorities for all models 320 included in the selected domain, where some models 320, such as those near a domain root of a model graph representing the selected domain, may be kept activated between passes, and (2) model residencies for all models 320 included in the selected domain, where each model 320 either has a model residency requiring the model 320 to run on-device (i.e., on-device model) or a different model residency requiring the model 320 to run on-cloud (i.e., on-cloud model).

In one embodiment, the execution manager 700 seamlessly combines on-device models and on-cloud models. For each on-device model, the model load balancer unit 731 activates the on-device model by activating/starting an engine 340 with appropriate hyper-parameters and loading the on-device model into the active engine 340. For each on-cloud model, the model load balancer unit 731 initializes a client endpoint needed to communicate with a cloud service that will run the on-cloud model. The model load balancer unit 731 may exchange messages with each engine 340 activated and/or each client endpoint initialized (e.g., exchange of activation requests and activation replies).

Figure 11:
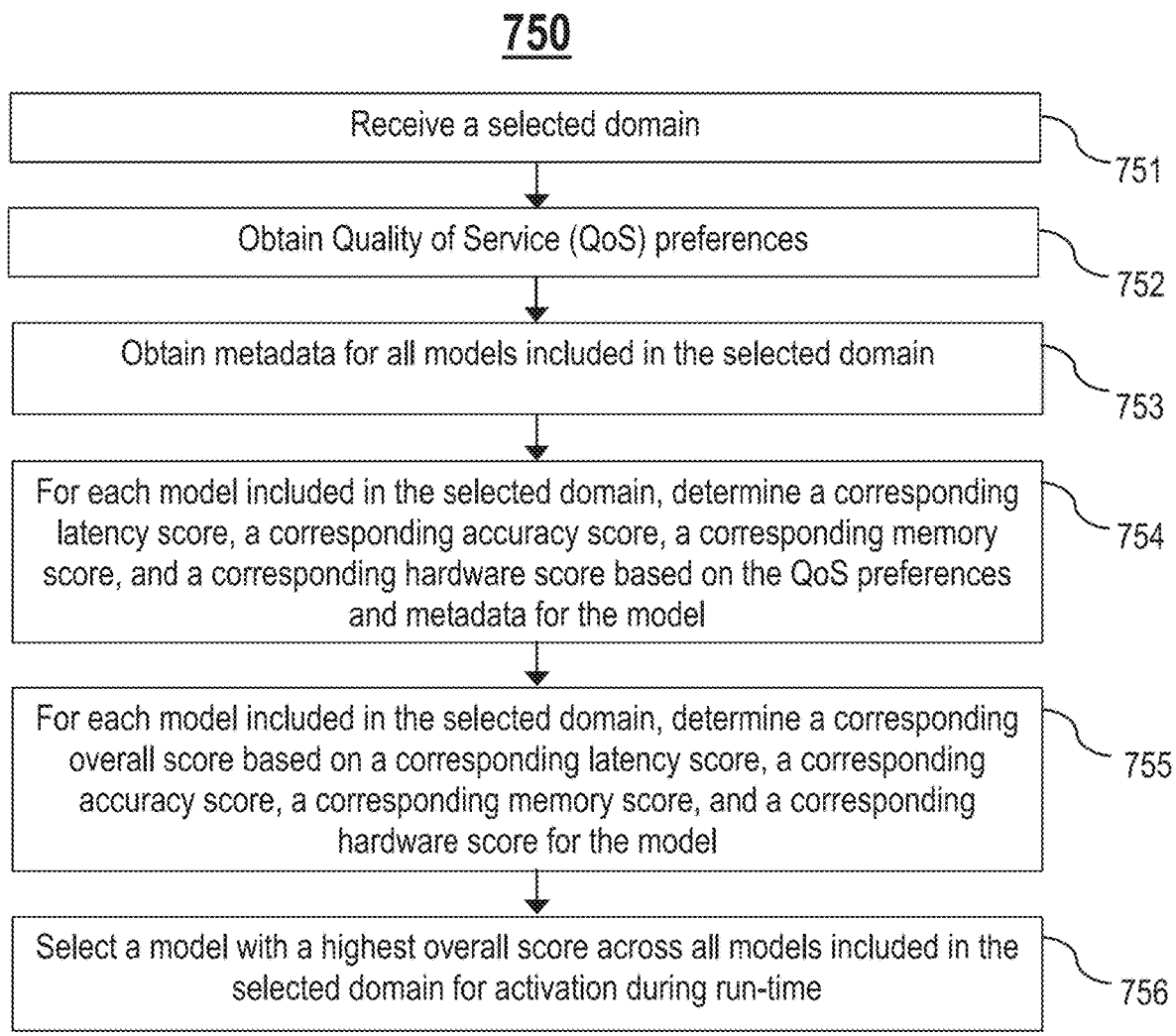
FIG. 11 is a flowchart of an example process for automatically selecting a model for activation, in one or more embodiments.

FIG. 11 is a flowchart of an example process 750 for automatically selecting a model 320 for activation, in one or more embodiments. In process block 751, receive a selected domain (e.g., from the domain selection system 720). In process block 752, obtain QoS preferences (e.g., QoS preferences information 732). In process block 753, obtain metadata for all models included in the selected domain (e.g., model metadata information 733). In process block 754, for each model included in the selected domain, determine a corresponding latency score, a corresponding accuracy score, a corresponding memory score, and a corresponding hardware score based on the QoS preferences and metadata for the model. In process block 755, for each model included in the selected domain, determine a corresponding overall score based on a corresponding latency score, a corresponding accuracy score, a corresponding memory score, and a corresponding hardware score for the model. In process block 756, select a model with a highest overall score across all models included in the selected domain for activation during run-time.

In one embodiment, process blocks 751-756 may be performed by one or more components of the model selection system 730, such as, but not limited to, the model load balancer unit 731.

Figure 12:
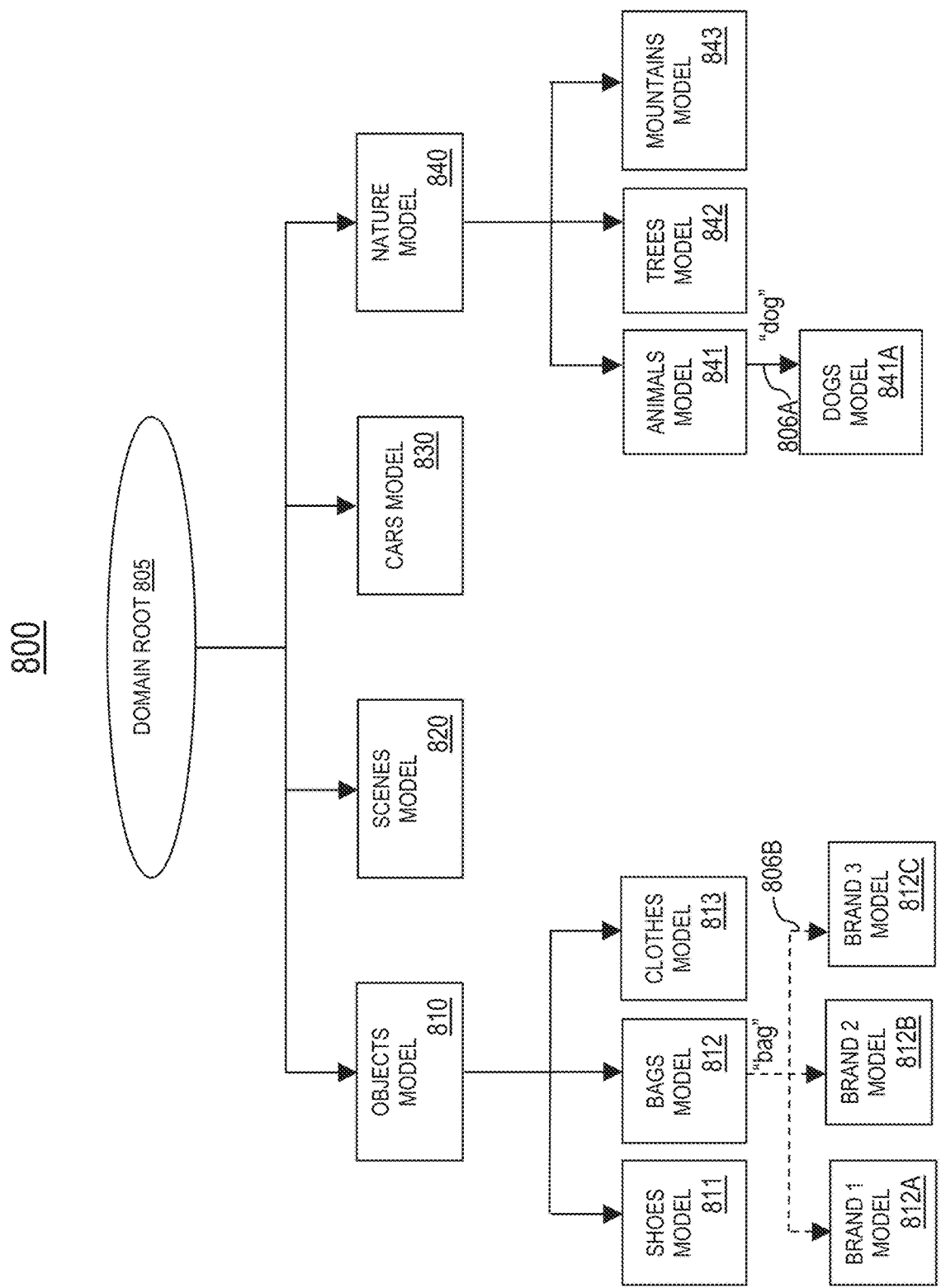
FIG. 12 illustrates an example model graph including category ontology links, in one or more embodiments.

FIG. 12 illustrates an example model graph 800 including category ontology links, in one or more embodiments. The model graph 800 comprises a domain root 805 indicative of the Everyday domain represented by the model graph 800. The model graph 800 comprises multiple category nodes representing multiple models 320 such as, but not limited to, an objects recognition model 810 for recognizing everyday objects, a scenes recognition model 820 for recognizing scenes, a car model 830 for recognizing car models, and a nature model 840 for recognizing nature.

As shown in FIG. 12, the objects recognition model 810 is linked to one or more additional models 320, such as a shoes model 811 for recognizing shoe types/brands, a bags model 812 for recognizing bag types/brands, and a clothes model 813 for recognizing clothing types/brands.

As shown in FIG. 12, the nature model 840 is linked to one or more additional models 320, such as an animals model 841 for recognizing animals, a trees model 842 for recognizing trees, and a mountains model 843 for recognizing mountains.

In one embodiment, the hierarchy-based domain selector 721 assumes each object recognized by a model 320 is associated with a category node of a model graph, and further assumes a model 320 is associated with a set of category nodes. In one embodiment, the hierarchy-based domain selector 721 generates/forms a category ontology link between a first model $m_1$ and a second model $m_2$ if an object recognized by the first model $m_1$ has the same category node as one of the category nodes of the second model $m_2$. In one embodiment, the model graph 800 comprises one or more category ontology links. For example, as shown in FIG. 12, the model graph 800 comprises a category ontology link 806A between the animals model 841 and each of the following on-device models 320: a dogs model 841A for recognizing dog types/breeds. As shown in FIG. 12, the model graph 800 further comprises a category ontology link 806B between the bags model 812 and each of the following on-cloud models 320: a first brand model 812A for recognizing bags of a first type of brand (e.g., Coach®), a second brand model 812B for recognizing bags of a second type of brand (e.g., Kors®), and a third brand model 812C for recognizing bags of a third type of brand (e.g., Kate Spade®).

In one embodiment, the hierarchy-based domain selector 721 may use normalized word spaces (e.g., WordNet) to generate category ontology links from objects recognized by one model to objects recognized by one or more other models.

Figure 13A:
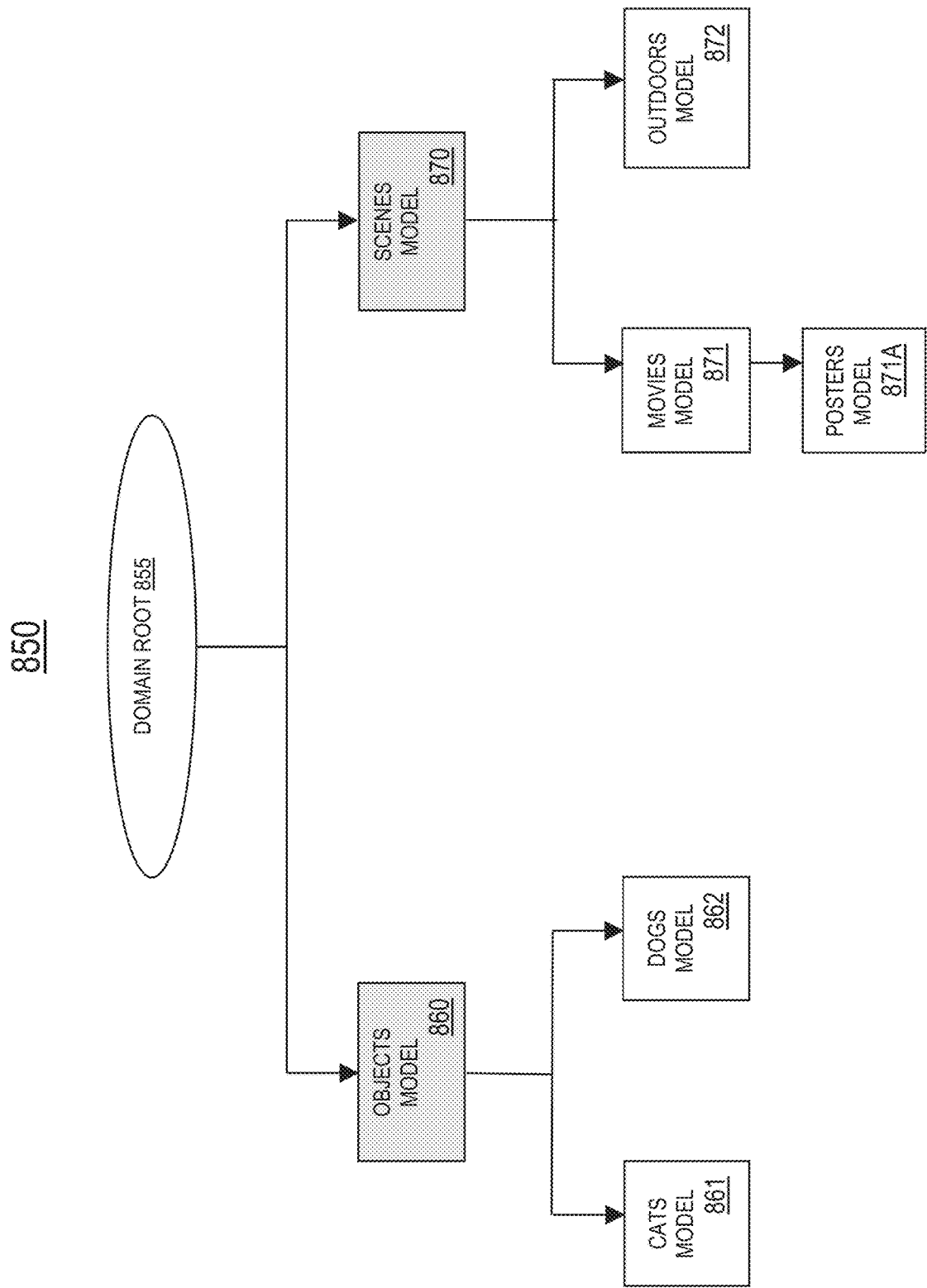
FIG. 13A is a model graph illustrating one or more models initially activated by the execution manager, in one or more embodiments.
Figure 13B:
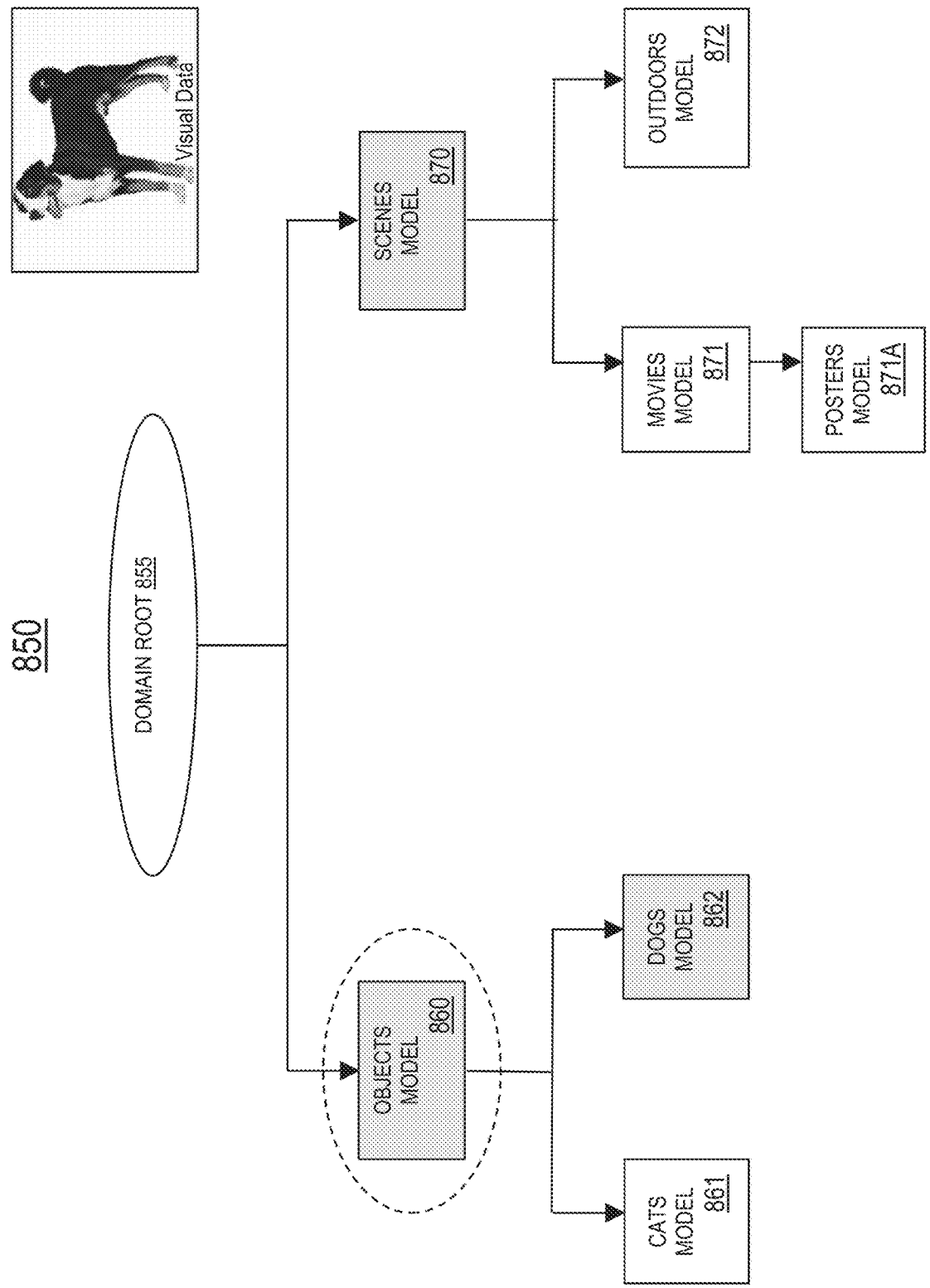
FIG. 13B is an updated model graph illustrating one or more additional models activated by the execution manager in response to receiving visual data, in one or more embodiments.
Figure 13C:
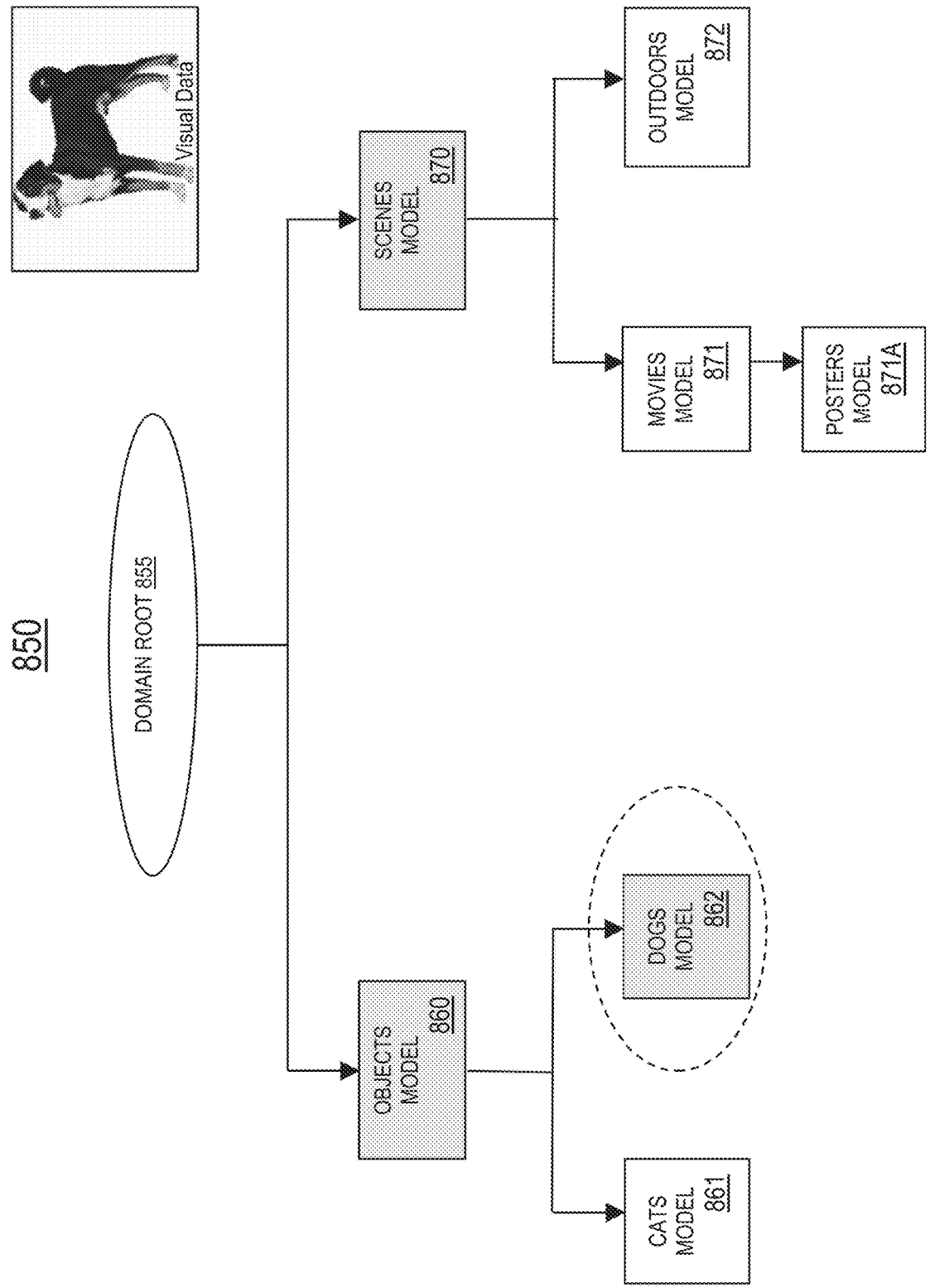
FIG. 13C is an updated model graph illustrating one or more additional models activated by the execution manager in response to a visual classifier result, in one or more embodiments.

FIGS. 13A-13C illustrates a sequence of operations performed by the execution manager 700 for automatically selecting a model 320 for activation, in one or more embodiments. Specifically, FIG. 13A is a model graph 850 illustrating one or more models 320 initially activated by the execution manager 700, in one or more embodiments. As shown in FIG. 13A, in an initial state (i.e., before the execution manager 700 receives visual data), the execution manager 700 activates only the following two models 320: (1) an objects recognition model 860 for recognition of everyday objects, and (2) a scenes recognition model 870 for recognition of scenes. All other models 320 shown in FIG. 13A, such as a cats recognition model 861, a dogs recognition model 862, a movies recognition model 871, an outdoors recognition model 872, and a posters recognition model 871A, are inactive.

FIG. 13B is an updated model graph 850 illustrating one or more additional models 320 activated by the execution manager 700 in response to receiving visual data, in one or more embodiments. As shown in FIG. 13B, in response to receiving visual data comprising an image of a dog, the objects recognition model 860 processes the visual data and generates a corresponding visual classifier result comprising a classification label "dog" with an associated 0.988 confidence value. Assuming the 0.988 meets one or more pre-determined confidence thresholds, the execution manager 700 then activates the dogs recognition model 862 based on a category ontology link between the objects recognition model 860 and the dogs recognition model 862. All other models 320 shown in FIG. 13A, such as the cats recognition model 861, the movies recognition model 871, the outdoors recognition model 872, and the posters recognition model 871A, remain inactive.

FIG. 13C is an updated model graph 850 illustrating one or more additional models 320 activated by the execution manager 700 in response to a visual classifier result, in one or more embodiments. In response to the visual classifier result generated by the objects recognition model 860, another activate model 320 processes the visual data. Specifically, as shown in FIG. 13C, the dogs recognition model 862 processes the visual data and generates a corresponding visual classifier result identifying a dog breed of the dog present in the visual data. For example, the visual classifier result may comprise a classification label "Appenzeller" with an associated 0.461 confidence value.

Figure 14:
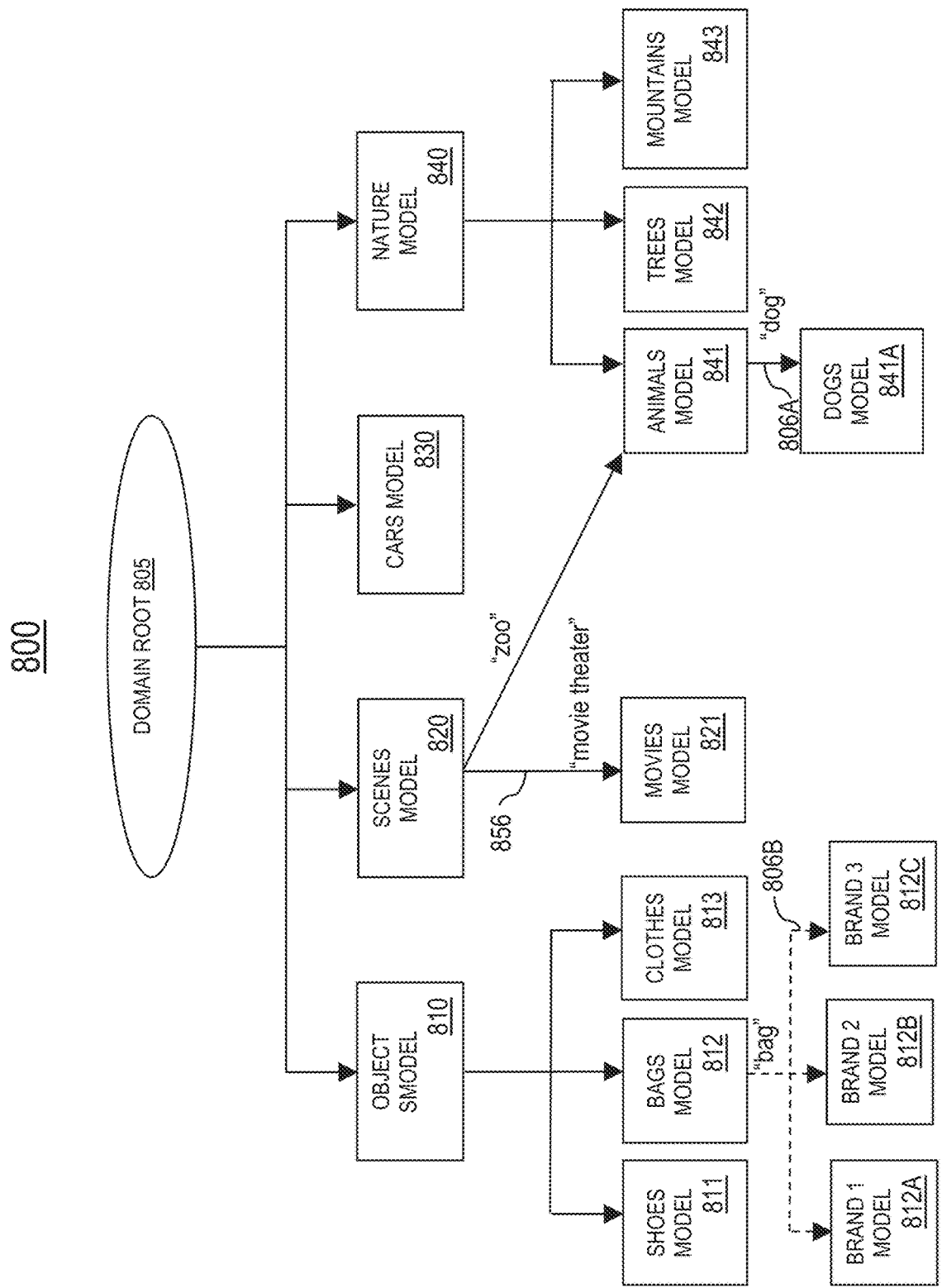
FIG. 14 illustrates the example model graph including category similarity links, in one or more embodiments.

FIG. 14 illustrates the example model graph 800 including category similarity links, in one or more embodiments. In one embodiment, the hierarchy-based domain selector 721 generates/forms a category similarity link 856 between a first model $m_1$ and a second model $m_2$ if an object recognized by the first model $m_1$ has a category node that is similar to a category node of the second model $m_2$ based on similarity metrics. In one embodiment, the model graph 800 further comprises one or more category similarity links 856. For example, as shown in FIG. 14, the model graph 800 comprises a category similarity link 856 between the scenes recognition model 820 and each of the following models: a movies model 821 for recognizing movies/films (e.g., movie/film posters) as an object "movie theater" recognized by the scenes recognition model 820 is similar to an object "movie" recognized by the movies model 821, and the animals model 841 as an object "zoo" recognized by the scenes recognition model 820 is similar to an object "animal" recognized by the animals model 841.

In one embodiment, the hierarchy-based domain selector 721 may use word similarity metrics on normalized word spaces (e.g., Word2Vec) to generate category similarity links from objects recognized by one model 320 to similar objects recognized by one or more other models 320.

Figure 15:
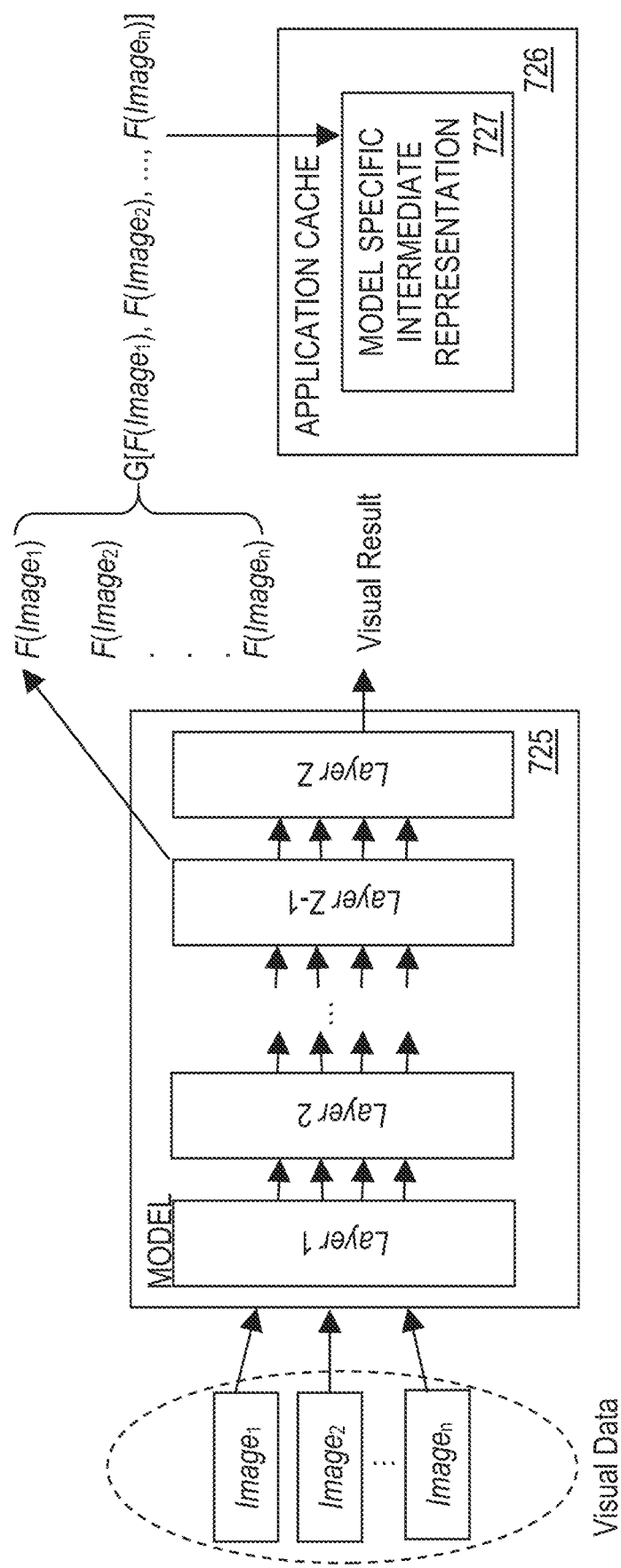
FIG. 15 illustrates an example feature vector-based domain selection method, in one or more embodiments.

FIG. 15 illustrates an example feature vector-based domain selection method, in one or more embodiments. As stated above, the feature vector-based domain selector 722 selects a domain in accordance with a feature vector-based domain selection method. Let $Image_n$ generally denote an image/video frame included in visual data received by the execution manager 700, wherein n is a positive integer. In one embodiment, the feature vector-based domain selector 722 is configured to: (1) for each image/video frame $Image_n$, extract a corresponding intermediate feature representation $F(Image_n)$ utilizing a model 725 for feature extraction, such as a neural network architecture comprising multiple layers (e.g., Layer 1, Layer 2, . . . , Layer Z-1, Layer Z), and (2) generate a model specific intermediate representation (MSIR) 727 for the visual data by applying a linear transformation G[ ] (e.g., averaging) over each intermediate feature representation $F(Image_n)$ extracted (i.e., $G[F(Image_1), F(Image_2), \ldots, F(Image_n)]$. In one embodiment, the MSIR 727 is maintained in an application cache 726 of the VI management system 300 for later use by the feature vector-based domain selector 722 (e.g., comparing against other MSIRs generated).

In one embodiment, the feature vector-based domain selector 722 compares feature representations for the visual data against feature representations for available domains, and selects a domain from the available domains having the smallest distance metric.

In one embodiment, if a cloud service is used, the use of feature vectors improves privacy as the feature vectors are sent to a cloud service instead of actual image/video frames.

Figure 16:
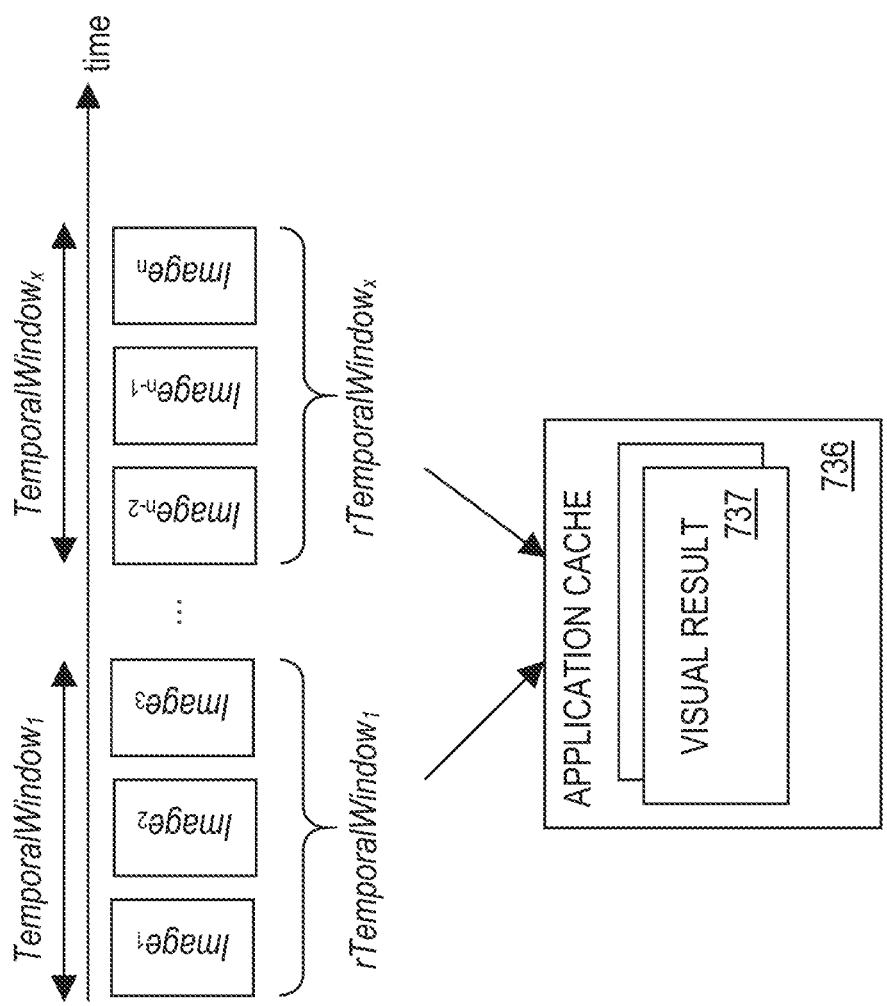
FIG. 16 illustrates an example temporal-based domain selection method, in one or more embodiments.

FIG. 16 illustrates an example implementation of the temporal-based domain selector 723, in one or more embodiments. As stated above, the temporal-based domain selector 723 selects a domain in accordance with a temporal-based domain selection method. Let $TemporalWindow_x$ generally denote a temporal window comprising a sequence (i.e., subset) of image/video frames included in visual data received by the execution manager 700 over time, wherein x is a positive integer. In one embodiment, the temporal-based domain selector 723 is configured to segment the visual data into multiple temporal windows. In one embodiment, the temporal-based domain selector 723 is configured to determine, for each temporal window $TemporalWindow_x$, a corresponding feature representation. The temporal-based domain selector 723 compares feature representations for the temporal windows against feature representations for available domains, and selects a domain from the available domains having the smallest distance metric.

Let $rTemporalWindow_x$ generally denote a visual classifier result 737 for a temporal window. In one embodiment, the temporal-based domain selector 723 is configured to determine, for each temporal window $TemporalWindow_x$, a corresponding visual classifier result $rTemporalWindow_x$. In one embodiment, each visual classifier result $rTemporalWindow_x$ determined for each temporal window $TemporalWindow_x$ is maintained in an application cache 736 of the VI management system 300 for later use by the temporal-based domain selector 723.

Figure 17:
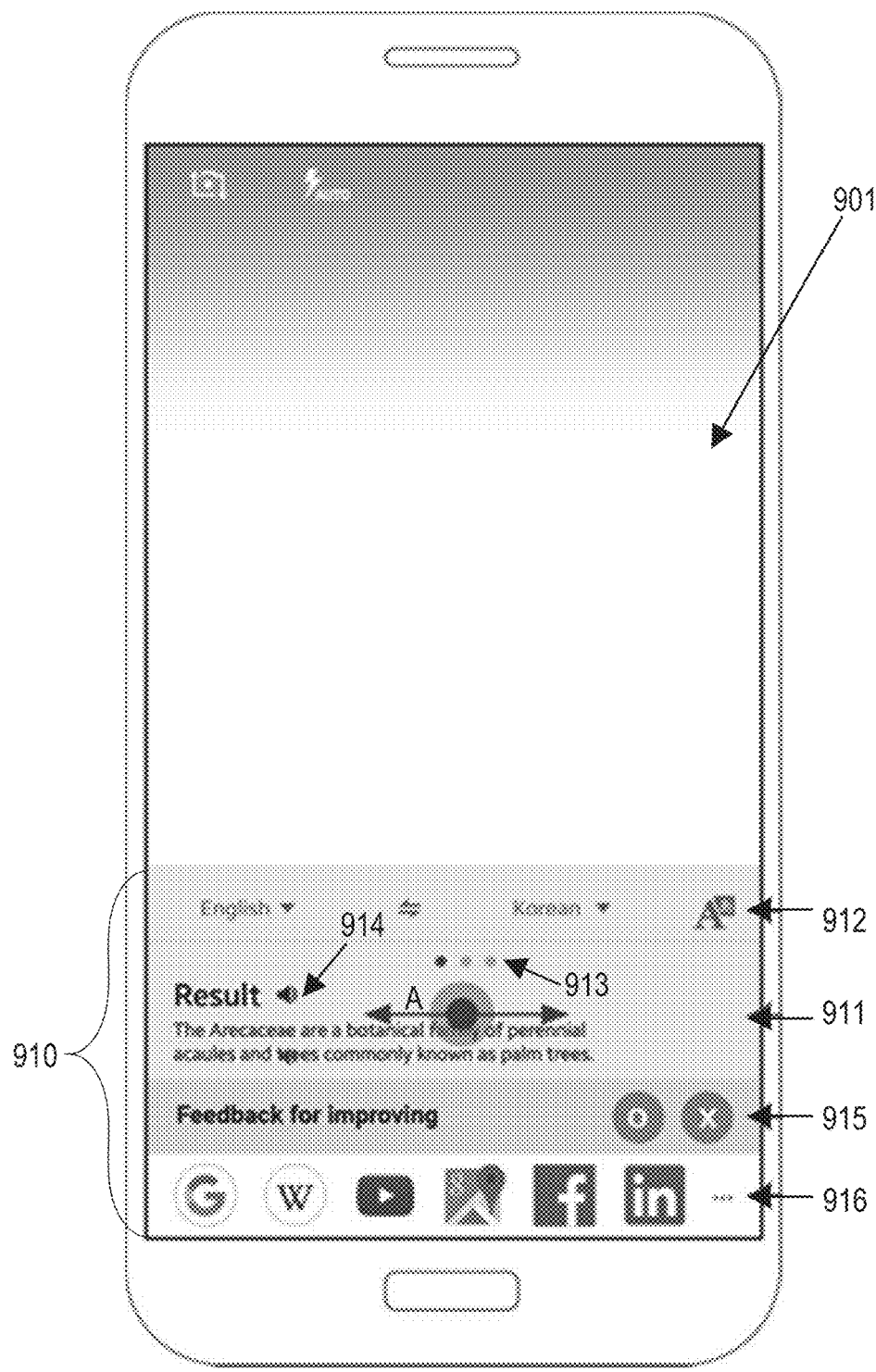
FIG. 17 illustrates an example application screen driven by the parallel model execution, in one or more embodiments.

FIG. 17 illustrates an example application screen 900 driven by the parallel model execution, in one or more embodiments. In one embodiment, the virtual assistant of the camera application 161 generates an application screen 900 for display to a user. As shown in FIG. 17, the application screen 900 is an example interface including a camera view 901 of the camera 140 and a result card (i.e., information card) 910. The result card 910 includes a visual classifier result 911 for an object present in the camera view 901. In one embodiment, if the object present in the camera view 901 comprises text, the visual classifier result 911 may include an optical character recognition (OCR) of the text.

As shown in FIG. 17, the application screen 900 comprises one or more selectable GUI elements such as, but not limited to, the following: (1) a first component 912 for invoking a translation of the visual classifier result 911 into a selected language (e.g., Korean), (2), a second component 913 for scrolling through multiple result cards 910 using hand gestures (e.g., swiping left or right, as illustrated by directional arrow A), (3) a third component 914 for speech capabilities (e.g., providing a machine-generated reading of the virtual classifier result 911), (4) a fourth component 915 for receiving user feedback as input, and (5) a fifth component 916 for invoking one or more cloud services to perform further search for additional information related to the visual classifier result 911.

Figure 18C:
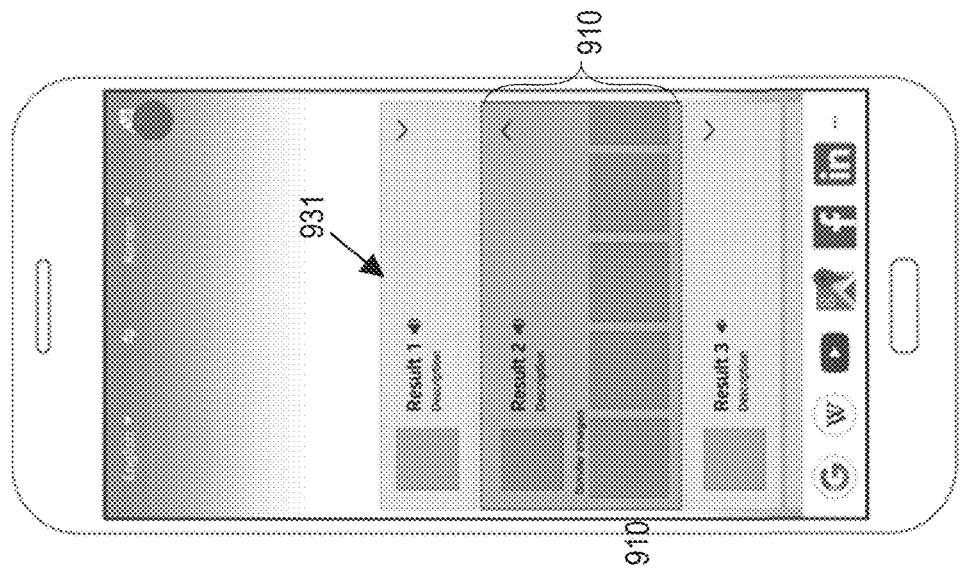
FIG. 18C illustrates the application screen including an expanded result card, in one or more embodiments.
Figure 18B:
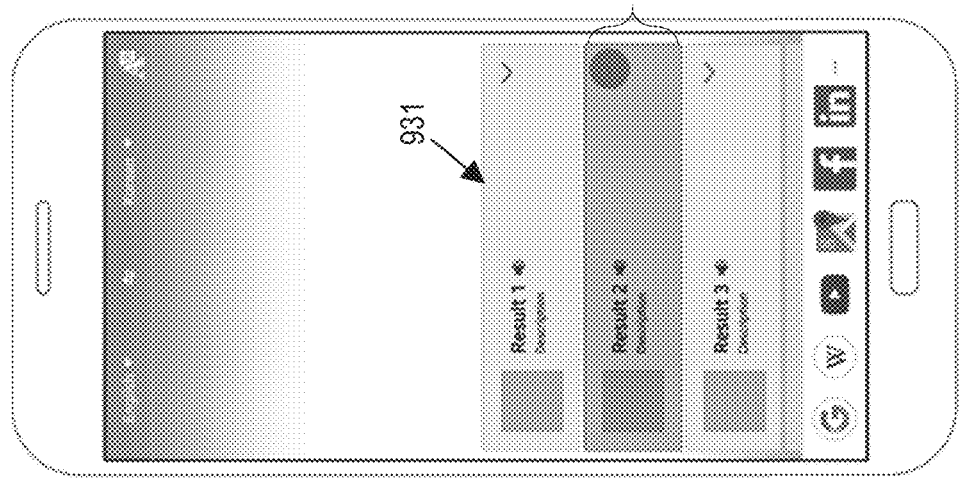
FIG. 18B illustrates the application screen including multiple result cards, in one or more embodiments.
Figure 18A:
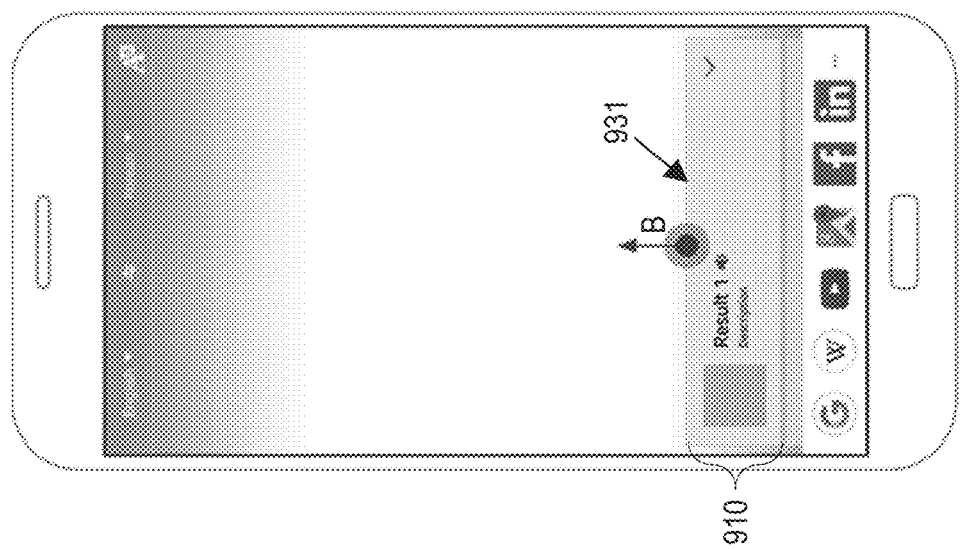
FIG. 18A illustrates the application screen including one result card, in one or more embodiments.

FIGS. 18A-18C each illustrate another example application screen 930 for displaying multiple results cards 910, in one or more embodiments. Specifically, FIG. 18A illustrates the application screen 930 including one result card 910, in one or more embodiments. In one embodiment, the virtual assistant of the camera application 161 generates an application screen 930 for display to a user. The application screen 930 is an example interface comprising a pull-up list 931 of result cards 910. As shown in FIG. 18A, only one result card 910 is displayed in the pull-up list 931. The user may scroll/browse through the pull-up list 931 by swiping the pull-up list 931 up (as illustrated by directional arrow B) to expand the pull-up list 931 or swiping the pull-up list 931 down to decrease/dismiss the pull-up list 931 shown.

FIG. 18B illustrates the application screen 930 including multiple result cards 910, in one or more embodiments. As shown in FIG. 18B, in response to the user swiping up the pull-up list, the application screen 930 updates to display additional results cards 910. The user may select any one of the result cards 910 displayed to expand the selected result card 910 and view additional details related to the selected result card 910.

FIG. 18C illustrates the application screen 930 including an expanded result card 910, in one or more embodiments. As shown in FIG. 18C, the expanded result card 910 may include additional details and/or additional images related to a virtual classifier result included in the result card 910.

FIGS. 19A-19C each illustrate another example application screen 920 for displaying a result card 910 that is paired with an object present in the camera view 901 of the camera 140, in one or more embodiments. Specifically, FIG. 19A illustrates the application screen 920 displaying a first result card 910 paired with a first object present in the camera view 901, in one or more embodiments. In one embodiment, the virtual assistant of the camera application 161 generates an application screen 920 for display to a user. As shown in FIG. 19A, the application screen 920 is an example interface including a camera view 901 of the camera 140, a first result card 910 for a first object (Object 1) present in the camera view 901, and a first bounding box 921 highlighting a first region in the camera view 901 where the first object is detected. The user may scroll/browse through multiple result cards 910 included in the application screen 920 using hand gestures (e.g., swiping left, as illustrated by directional arrow C).

FIG. 19B illustrates the application screen 920 displaying a second result card 910 paired with a second object present in the camera view 901, in one or more embodiments. As shown in FIG. 19B, in response to the user swiping the first result card 910, the application screen 920 updates to display a second result card 910 for a second object (Object 2) present in the camera view 901, and a second bounding box 922 highlighting a second region in the camera view 901 where the second object is detected. The user may scroll through other result cards 910 (e.g., returning back to the first result card 910 or viewing other result cards 910) using hand gestures (e.g., swiping left or right, as illustrated by directional arrow D).

FIG. 19C illustrates the application screen 920 displaying an expanded second result card 910, in one or more embodiments. As shown in FIG. 19C, the user may expand the second result card 910 by swiping the second result card 910 up (as illustrated by directional arrow E) to expand the second result card 910 and view additional details related to the selected result card 910. As shown in FIG. 19C, the expanded second result card 910 may include additional details and/or additional images related to a virtual classifier result included in the second result card 910. The user may dismiss the expanded second result card 910 by swiping the expanded second result car 910 down.

In one embodiment, if there are multiple result cards 910 available for a user to scroll/browse through, the result cards 910 may be organized based on accuracy of virtual classifier results included in the result cards 910 (i.e., confidence values).

FIG. 20 is a flowchart of an example process 1000 for processing visual data, in one or more embodiments. In process block 1001, classify one or more objects present in an input comprising visual data by executing a first set of models associated with a domain on the input, where each model of the first set of models corresponds to an object category, and each model is trained to generate a visual classifier result relating to a corresponding object category in the input with an associated confidence value indicative of accuracy of the visual classifier result.

In process block 1002, aggregate a first set of visual classifier results based on confidence value associated with each visual classifier result of each model of the first set of models.

In process block 1003, select a second set of models to execute on the input based on the aggregated first set of visual classifier results and one or more hierarchical relationships between the first set of models and one or more other models.

In process block 1004, determine an execution order of the second set of models based on one or more quality of service (QoS) preferences and model metadata information corresponding to the second set of models.

In process block 1005, execute the second set of models in accordance with the execution order.

In one embodiment, process blocks 1001-1005 may be performed by one or more components of the VI management system 300, such as the execution manager 700.

Figure 21:
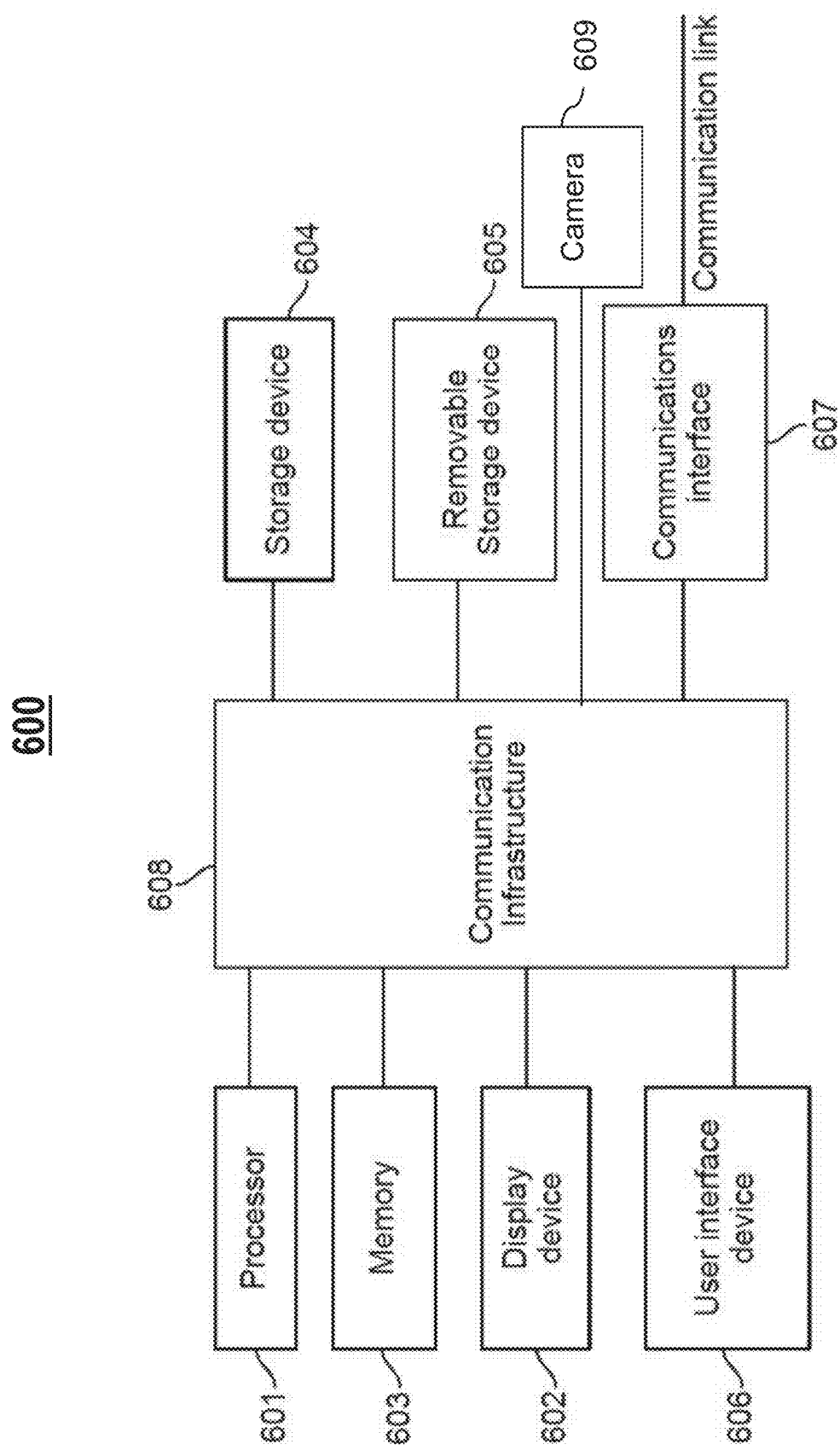
FIG. 21 is an exemplary high-level block diagram showing an information processing system comprising a computer system useful for implementing disclosed embodiments.

FIG. 21 is a high-level block diagram showing an information processing system comprising a computer system 600 useful for implementing the disclosed embodiments. Computer system 600 may be incorporated in an electronic device 100 or a server device (e.g., a server 200). The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), a communication interface 607 (e.g., modem, a network interface (such as an Ethernet card), a communications port, or a PCMCIA slot and card), and a camera 609. The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 750 (FIG. 11) and process 1000 (FIG. 20) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including a product oriented programming language such as Java, Smalltalk, C++ or the like and conventional procedural programming languages, such as the "C" programming language or similar programming languages. The program code may execute entirely on the viewer's computer, partly on the viewer's computer, as a stand-alone software package, partly on the viewer's computer and partly on a remote computer or entirely on the remote computer or server. In the latter scenario, the remote computer may be connected to the viewer's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
classifying one or more objects present in an input comprising visual data by executing a first set of models associated with a domain on the input, wherein each model of the first set of models corresponds to an object category, and each model is trained to generate a visual classifier result relating to a corresponding object category in the input with an associated confidence value indicative of accuracy of the visual classifier result; and
aggregating a first set of visual classifier results based on confidence value associated with each visual classifier result of each model of the first set of models, wherein the one or more objects are further classified by selecting at least one other model for execution on the input based on the aggregated first set of visual classifier results and at least one similarity between a first set of objects recognized by the first set of models and at least one object recognized by the at least one other model, and one or more visual classifier results are returned to an application running on an electronic device for display.

2. The method of claim 1, further comprising:
further classifying the one or more objects by selecting a second set of models to execute on the input based on the aggregated first set of visual classifier results and one or more similarities between the first set of objects recognized by the first set of models and a second set of objects recognized by the second set of models.

3. The method of claim 2, wherein the one or more similarities are indicative of a category ontology link between a first model of the first set of models and a second model of the second set of models, and the category ontology link represents that an object recognized by the first model has an object category that is the same as an object category corresponding to the second model based on ontology information relating to the first model and the second model.

4. The method of claim 2, wherein the one or more similarities are indicative of a category similarity link between a first model of the first set of models and a second model of the second set of models, and the category similarity link represents that an object recognized by the first model has an object category that is similar to an object category corresponding to the second model based on a similarity metric between the first model and the second model.

5. The method of claim 2, further comprising:
determining an execution order of the second set of models based on one or more quality of service (QoS) preferences and model metadata information corresponding to the second set of models; and
executing the second set of models in accordance with the execution order.

6. The method of claim 5, wherein the one or more QoS preferences comprises at least one of: a pre-determined threshold of engines that can be run simultaneously on the electronic device for execution of the second set of models, one or more resource requirements for execution of the second set of models, or information indicative of one or more models currently loaded into one or more engines.

7. The method of claim 5, wherein the model metadata information corresponding to the second set of models comprises at least one of: one or more model priorities for the second set of models, or one or more model residencies for the second set of models.

8. The method of claim 1, further comprising:
selecting the domain based on the input and a domain selection method, wherein the selected domain is associated with at least one model that is selectable for execution on the input.

9. The method of claim 8, wherein the domain selection method is a hierarchy-based domain selection method, and selecting the domain comprises:
selecting the domain based on one or more hierarchical relationships between multiple models organized hierarchically into a hierarchical structure based on hierarchical relationships between multiple object categories corresponding to the multiple models, the multiple models including the first set of models.

10. The method of claim 8, wherein the domain selection method is a feature vector-based domain selection method, and selecting the domain comprises:
maintaining a first set of feature representations for a first set of domains, wherein each feature representation of the first set of representations corresponds to a domain of the first set of domains; and
for each frame included in the input:
extracting, from the frame, a feature representation for the frame; and
selecting the domain from the first set of domains by comparing the feature representation for the frame against each feature representation of the first set of feature representations, the selected domain having a corresponding feature representation that is closest to the feature representation for the frame.

11. The method of claim 8, wherein the domain selection method is a temporal-based domain selection method, and selecting the domain comprises:
maintaining a first set of feature representations for a first set of domains, wherein each feature representation of the first set of representations corresponds to a domain of the first set of domains;
segmenting the input into multiple temporal windows, wherein each temporal window comprises a sequence of frames included in the input; and
for each temporal window:
extracting, from the temporal window, a feature representation for the temporal window; and
selecting the domain from the first set of domains by comparing the feature representation for the temporal window against each feature representation of the first set of feature representations, the selected domain having a corresponding feature representation that is closest to the feature representation for the temporal window.

12. The method of claim 8, further comprising:
selecting one or more models associated with the selected domain to activate for execution on the input based on at least one of: a pre-determined threshold of engines that can be run simultaneously on the electronic device, run-time resource requirements of all models associated with the selected domain, information indicative of one or more models that are currently active, information indicative of which of all models associated with the selected domain must remain active between execution passes, information indicative of which of all models associated with the selected domain must run on the electronic device, or information indicative of which of all models associated with the selected domain must run in a cloud service.

13. A system, comprising:
at least one processor; and
a non-transitory processor-readable memory device storing instructions that when executed by the at least one processor causes the at least one processor to perform operations including:
classifying one or more objects present in an input comprising visual data by executing a first set of models associated with a domain on the input, wherein each model of the first set of models corresponds to an object category, and each model is trained to generate a visual classifier result relating to a corresponding object category in the input with an associated confidence value indicative of accuracy of the visual classifier result; and
aggregating a first set of visual classifier results based on confidence value associated with each visual classifier result of each model of the first set of models, wherein the one or more objects are further classified by selecting at least one other model for execution on the input based on the aggregated first set of visual classifier results and at least one similarity between a first set of objects recognized by the first set of models and at least one object recognized by the at least one other model, and one or more visual classifier results are returned to an application running on an electronic device for display.

14. The system of claim 13, wherein the operations further comprise:
further classifying the one or more objects by selecting a second set of models to execute on the input based on the aggregated first set of visual classifier results and one or more similarities between the first set of objects recognized by the first set of models and a second set of objects recognized by the second set of models;
determining an execution order of the second set of models based on one or more quality of service (QoS) preferences and model metadata information corresponding to the second set of models; and
executing the second set of models in accordance with the execution order.

15. The system of claim 13, wherein the operations further comprise:
selecting the domain based on the input and a domain selection method, wherein the selected domain is associated with at least one model that is selectable for execution on the input.

16. The system of claim 15, wherein the domain selection method is a hierarchy-based domain selection method, and selecting the domain comprises:
selecting the domain based on one or more hierarchical relationships between multiple models organized hierarchically into a hierarchical structure based on hierarchical relationships between multiple object categories corresponding to the multiple models, the multiple models including the first set of models.

17. The system of claim 15, wherein the domain selection method is a feature vector-based domain selection method, and selecting the domain comprises:
maintaining a first set of feature representations for a first set of domains, wherein each feature representation of the first set of representations corresponds to a domain of the first set of domains; and
for each frame included in the input:

extracting, from the frame, a feature representation for the frame; and selecting the domain from the first set of domains by comparing the feature representation for the frame against each feature representation of the first set of feature representations, the selected domain having a corresponding feature representation that is closest to the feature representation for the frame.

18. The system of claim 15, wherein the domain selection method is a temporal-based domain selection method, and selecting the domain comprises:

maintaining a first set of feature representations for a first set of domains, wherein each feature representation of the first set of representations corresponds to a domain of the first set of domains;

segmenting the input into multiple temporal windows, wherein each temporal window comprises a sequence of frames included in the input; and for each temporal window:

extracting, from the temporal window, a feature representation for the temporal window; and selecting the domain from the first set of domains by comparing the feature representation for the temporal window against each feature representation of the first set of feature representations, the selected domain having a corresponding feature representation that is closest to the feature representation for the temporal window.

19. The method of claim 15, wherein the operations further comprise:

selecting one or more models associated with the selected domain to activate for execution on the input based on at least one of: a pre-determined threshold of engines that can be run simultaneously on the electronic device, run-time resource requirements of all models associated with the selected domain, information indicative of one or more models that are currently active, information indicative of which of all models associated with the selected domain must remain active between execution passes, information indicative of which of all models associated with the selected domain must run on the electronic device, or information indicative of which of all models associated with the selected domain must run in a cloud service.

20. A non-transitory computer readable storage medium including instructions to perform a method comprising:

classifying one or more objects present in an input comprising visual data by executing a first set of models associated with a domain on the input, wherein each model of the first set of models corresponds to an object category, and each model is trained to generate a visual classifier result relating to a corresponding object category in the input with an associated confidence value indicative of accuracy of the visual classifier result; and aggregating a first set of visual classifier results based on confidence value associated with each visual classifier result of each model of the first set of models, wherein the one or more objects are further classified by selecting at least one other model for execution on the input based on the aggregated first set of visual classifier results and at least one similarity between a first set of objects recognized by the first set of models and at least one object recognized by the at least one other model, and one or more visual classifier results are returned to an application running on an electronic device for display.

* * * * *